US012802070B1

(12) United States Patent
Tamblyn

(10) Patent No.: US 12,802,070 B1
(45) Date of Patent: Nov. 17, 2026

(54) OFFLINE DATA TRANSFER UTILIZING MACHINE LEARNING MODELS

(71) Applicant: Block, Inc., San Francisco, CA (US)

(72) Inventor: Isaac Tamblyn, Ottawa (CA)

(73) Assignee: Block, Inc., Oakland, CA (US)

( * ) Notice: Subject to any disclaimer, the term of this patent is extended or adjusted under 35 U.S.C. 154(b) by 129 days.

(21) Appl. No.: 17/956,332

(22) Filed: Sep. 29, 2022

(51) Int. Cl.
*G06Q 20/40* (2012.01)
*G06K 19/06* (2006.01)

(52) U.S. Cl.
CPC ... *G06Q 20/4016* (2013.01); *G06K 19/06037* (2013.01); *G06Q 2220/00* (2013.01)

(58) Field of Classification Search
CPC ........... G06Q 20/4016; G06Q 2220/00; G06K 19/06037
USPC ............................................................ 705/75
See application file for complete search history.

(56) References Cited

U.S. PATENT DOCUMENTS 10,049,349 B1 * 8/2018 Grassadonia .......... G06Q 20/10
10,496,979 B2 12/2019 Sebastien et al.
11,210,641 B2 12/2021 Grassadonia et al.
11,386,410 B2 * 7/2022 Bartrim .................. G06Q 20/20
12,086,808 B1 * 9/2024 Shahidzadeh ........ G06Q 20/425
2014/0006273 A1 1/2014 Gopinath et al.
2014/0372300 A1 12/2014 Blythe
2015/0006386 A1 1/2015 Tebbe
2015/0278796 A1 10/2015 Jiang et al.
2016/0005024 A1 1/2016 Harrell
2016/0012430 A1 1/2016 Chandrasekaran et al.
2019/0098016 A1 * 3/2019 Jeon ...................... H04L 63/123
2020/0043018 A1 * 2/2020 Mossoba ............ G06Q 30/0201
2020/0118106 A1 * 4/2020 Bartrim .............. G06Q 20/3223
2022/0188782 A1 6/2022 Grassadonia et al.
2022/0188827 A1 * 6/2022 Cifarelli ................. G06N 20/00
2024/0296384 A1 * 9/2024 Wang ..................... G06N 20/00

OTHER PUBLICATIONS

Me, G., "A secure and reliable local payment system", 2005 IEEE 62nd Vehicular Technology Conference (VTC-2005), pp. 2761-2765 (2005).

* cited by examiner

*Primary Examiner* — Zeshan Qayyum
(74) *Attorney, Agent, or Firm* — IP Spring

(57) ABSTRACT

Techniques described herein are directed to receiving an embedding indicating first characteristics of a user profile. That embedding is exchanged with another device, which also sends another embedding associated with that device. An on-device machine learning model is utilized to analyze the embedding along with an embedding of the transaction at issue to determine a risk metric associated with the transaction. The transaction can then be effectuated if the users agree to proceed with the transaction given the risk metric.

20 Claims, 12 Drawing Sheets

OFFLINE DATA TRANSFER UTILIZING MACHINE LEARNING MODELS

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
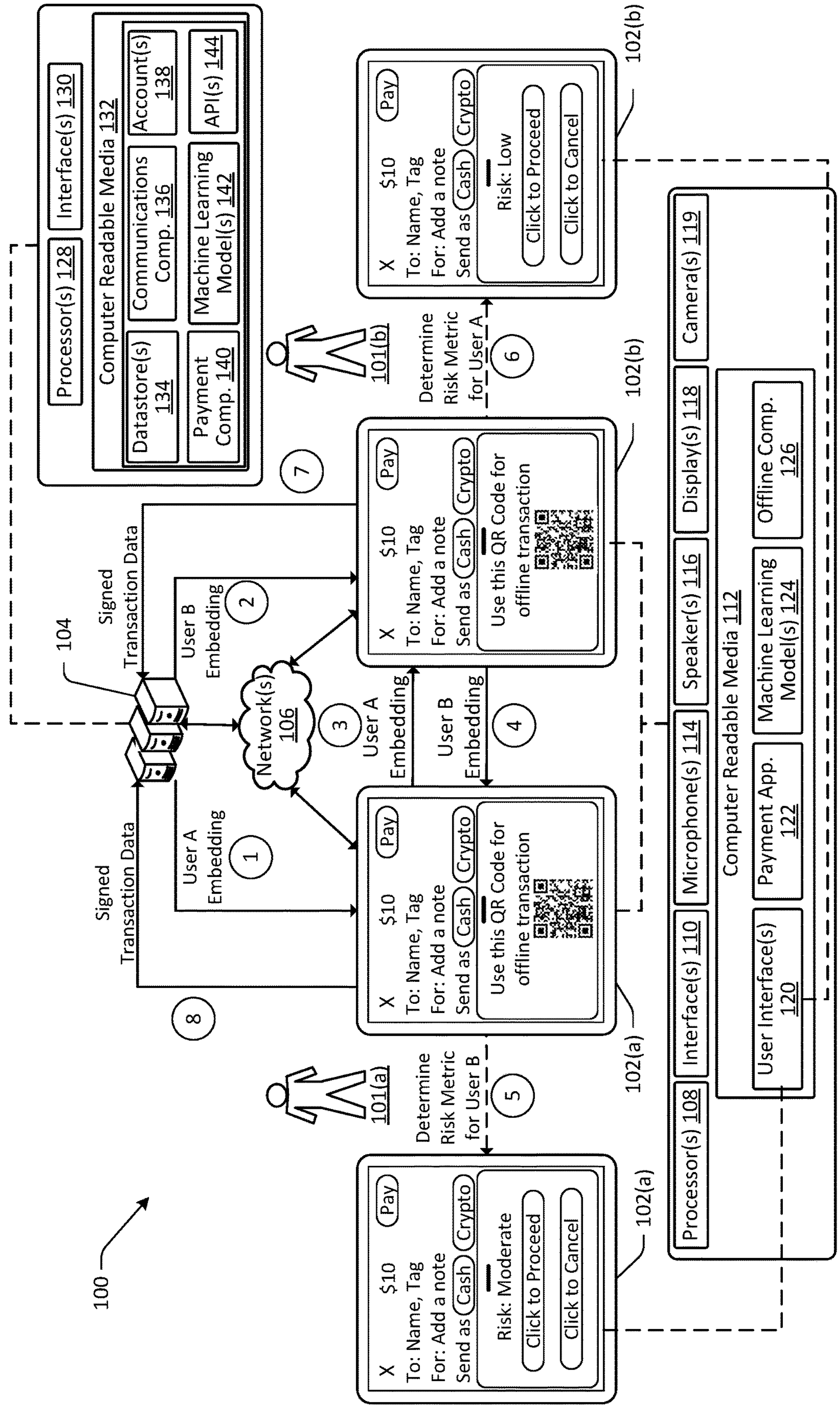
FIG. 1 is an example environment for offline data transfer utilizing on-device machine learning models, according to an embodiment described herein.

Techniques described herein are directed to, among other things, offline data transfer utilizing on-device machine learning models. In an example, techniques described herein may be utilized to provide transaction risk assessments to participants of a transaction even when user devices associated with those participants are offline or otherwise not connected to a payment service that would more generally perform such risk assessment operations. To do so, prior to user devices being offline (e.g., when the user devices are "online" and are connected to the payment service via a long-range communication network), encrypted embeddings of user information may be sent to and stored by user devices that subsequently are associated with a transaction. Then, when a transaction is initiated, those user embeddings may be exchanged between the user devices at issue. The user embeddings and transaction embeddings indicating details of the transaction at issue may be decrypted and utilized by on-device machine learning models to determine risk metrics for proceeding with the transaction. By so doing, users associated with the transaction may receive a risk metric of the other transaction participants prior to completion of the transaction, which may allow the users to determine whether to proceed with or cancel the transaction. By using such encrypted embeddings in combination with on-device machine learning models, techniques described herein can mitigate fraud associated with offline transactions between users.

As described more fully herein, user devices may be "online" or "offline." In at least one example, a user device is "online" when the user device is connected to the payment service via a long-range communication network and one or more other conditions are satisfied. In a least one example, a user device is "offline" when the user device is not able to connect to the payment service and/or one or more other conditions are not satisfied. Examples of the user devices being "offline" may include the user devices losing connectivity to a payment service, a frequency of network traffic associated with the payment service satisfying a threshold frequency of network traffic (e.g., network traffic at the payment service being greater than typical such that the user devices cannot reliably communicate with the payment service), a response to a request to communicate with the payment service not being received from the payment service, receiving an indication that the payment service is not operating, and receiving an indication that a security risk is present with respect to communications from the user devices to the payment service, for example.

Generally when a transaction is conducted a first user (e.g., a payor) may transact with a second user (e.g., a payee) for a given amount of money (or other currency including stocks, bonds, cryptocurrency, and/or other forms of currency). The paying user (e.g., the payor) typically selects a payment instrument to make a payment (e.g., for an item or a peer-to-peer payment), and then a user device, such as the payee's device, sends an approval request over a network connection to a payment service (e.g., servers or other computing devices associated therewith). The payment service then may determine whether there are sufficient funds, credit, etc. for the payor to make the payment, and, if appropriate, the payment service approves the transaction. The payee then receives the approval from the payment service, indicating that the transaction can proceed with little to no risk to the payee that the amount of funds will be transferred from the payor's account(s) to the payee's account(s). When the payor does not have sufficient funds or credit, a declination message may be sent by the payment service such that the payee knows the transaction is too risky to proceed or the payment service may simply not allow the transaction to proceed until the payor puts forward another payment method that is approved. It should be understood that while the users involved in a transaction are described here as a payor and a payee by way of example, the users may be any users associated with user accounts of the payment service.

In some examples, however, the user devices associated with the payor and the payee may be offline and thus the payment service may not be utilized to provide transaction approvals and declinations. In these examples, absent the techniques described herein, the payee may engage in transactions while the payee's device is in an offline mode, collecting transaction information for transactions conducted while offline. Once the transaction information can be sent to the payment service, the payee's device may send such transaction information trusting that such transactions are approved by the payment service. In instances where at least one of those transactions is not approved, the payee or the payment service may be responsible for the funds that were not obtained from the payor. As such, it would be beneficial for parties to a transaction to receive, at the time of a potential transaction, a robust and secure risk assessment for continuing with the transaction when the user devices in question are offline with respect to the payment service.

To do so, prior to the period of time when the user devices are offline, the payment service may be configured to generate and/or send embeddings to user devices, where the embeddings represent characteristics associated with a given user account. For example, periodically, such as once per day, once per several days, once per week, etc. the payment service may utilize transaction data and other data associated with a given user account, such as user preference data, data indicating how long a user account has been associated with the payment service, contacts data, payment card data, payment application use data, social networking data, profile completion data, etc., and a machine learning model to generate an embedding of characteristics determined from the transaction data and the other data. Examples of such characteristics may include an amount of time the user account has been associated with the payment service, a payment type utilized in association with the user account, incidents of the user account being deficient for a payment associated with the payment service, a frequency of interaction with the payment service over a period of time, and a frequency of recurring deposits made to the user account, for example. Another characteristic may include a length of time since an embedding was received for a given user account at a user device. While the payment service may send data representing these characteristics without generating an embedding, the generation of an embedding reduces the risk that the data will be intercepted by a nefarious actor and be usable to harm the user in question. That is, use of the embedding transforms the user account characteristics into a set of numbers or other representations that is difficult for a nefarious actor to understand and utilize. In some examples, the embeddings may be encrypted by the payment service prior to sending. It should be understood that the payment service may generate and send such embeddings to some or all of the user devices associated with some or all of the user accounts associated with the payment service, which could number in the hundreds of thousands if not millions.

The user device may, over time, receive the embeddings and store the embeddings. In some examples, the user device can remove an embedding from storage upon receipt of a new embedding, after a lapse of a period of time, until an event occurs or is predicted to occur, etc. In an example, a payor's device may be caused to display a user interface for entering payment information or selecting payment instruments during a payment portion of a transaction. Additionally, a payee's device may be caused to display a user interface for receiving the payment information or an approval of the selected payment instrument by the payor. At this point, or at any other point associated with a transaction, the user devices of the payor and the payee may determine whether such user devices are offline with respect to the payment service.

To do so, the payor's device may send the encrypted embedding to the payee device via a short-range communication protocol, such as Bluetooth®, Near-Field Communication (NFC), RFID, etc. In some examples, a quick reference (QR) code, encoded with an encrypted embedding, may be displayed on individual of the user devices, which may be configured to be captured, parsed, analyzed, and so on by the other of the user devices to receive the encrypted embeddings. The user device of the payee may then decrypt the encrypted embedding of the payor utilizing a public key associated with the payment service. Similarly, the payee's device may send the payee's embedding to the payor, which can be decrypted by the payor's user device using a public key associated with the payment service.

At this point, the payor and the payee devices may utilize the user account characteristics embeddings to generate a risk metric associated with the transaction at issue. In some examples, the transaction itself can be associated with an embedding indicating characteristics of the transaction, which may also be used in the generation of the risk metric associated with the transaction at issue. To do so, the user account characteristics embedding and the transaction embedding may be input into an on-device machine learning model previously received (e.g., while the user devices were online) and stored on individual ones of the user devices. Those on-device machine learning models may intake the user account characteristics embedding for the payor as well as the transaction characteristics embedding for the transaction and may produce, as output, a risk metric indicating a likelihood that the payment selected by the payor will be successfully used to transfer funds to the payee. In some examples, the payor's device may produce its own risk metric of the payee. This can be of particular interest, where a transaction involves an item to be purchased that may not necessarily be physically available to the payor at the time of purchase.

In some examples, the risk metrics output by the on-device models may cause the payor or payee to opt out of the transaction. In other examples, one or more of the risk metrics can interrupt a transaction and prompt the payor and/or payee to provide an input indicating that they desire to proceed with the transaction (e.g., in view of the risk indicated by the risk metric(s)). In examples where the parties to a given transaction (e.g., the payor and the payee) provide user input data indicating a selection to proceed with the transaction, one of the user devices associated with the transaction may digitally sign data documenting the transaction. That digitally signed data may be sent to the other user device(s) associated with the transaction, and, in some examples, those other user device(s) may also digitally sign the data documenting the transaction and return the co-signed data to the other user device(s) in the transaction such that individual user device(s) have fully digitally signed instances of the data documenting the transaction. Then, at some time after the transaction is concluded as between the offline user devices, one or more of the user devices may regain connectivity to the payment service or otherwise may transition from offline to online. At this point, the now online user device may send an instance of the digitally signed data documenting the transaction to the payment service, which may perform operations to effectuate the transaction by seeking to approve the payment of the payor and provide indications of payment to the payor and payee.

The techniques described herein include the ability to process a digital transaction between two user devices when neither of those user devices is connected to a network for approving and facilitating such a transaction. For example, typically an internet, cellular, or other long range, connection is utilized to send transaction data for a transaction to a payment service, which then communicates with one or more other systems or components of the payment service to determine whether the transaction at issue should be approved. Such processes may include determining whether a user has sufficient funds to pay for the transaction, determining whether a user has registered with the payment service, determining whether the user has a stored balance account with the payment service, determining whether a risk metric associated with the user satisfies a threshold (e.g., indicating the user is low risk, legitimate, etc.), etc. In these digital transactions where physical forms of currency are not transferred between users, such transaction approval operations are paramount to mitigating the ability of nefarious actors from fraudulently obtaining items or funds. However, when user devices are offline as described herein, such approval operations are not available from the payment service, particularly in a time-sensitive situation where users determine in a relatively short period of time whether to proceed with the transaction. The presently disclosed techniques solve this issue by utilizing specifically encrypted embeddings of a vast amount of user information in a way that allows trained machine learning models already stored on user devices to assess risk (including, for example, risk of non-payment, fraud, charge backs, risk of malicious code usage, etc.) (1) without transferring personal and sensitive information to the user devices, (2) in a manner that allows user devices with a public key to decrypt the embeddings, (3) and without requiring user devices involved in the transaction at issue to be connected to the internet. By so doing, issues that arise due to networking problems, such as those described herein, are alleviated.

Additionally, the generation and training of machine learning models to, among other things, utilize embeddings to generate risk assessments on-the-fly as between two users associated with a transaction, etc. The use of specifically trained machine learning models grounds the techniques described herein in a computer-centric environment and produces results that offer improvements over conventional technologies. These improvements include, for example, time sensitive generation of risk assessments on user devices associated with a transaction, which, as described above, may be performed even when user devices are offline and thus not able to receive risk assessments from a payment service or otherwise from a remote user device that stores user account characteristics data utilized to perform such risk assessments. Without these techniques, users associated with an offline transaction would not be able to identify risk metrics specific to a given transaction with specific users. The models may be trained again and again over time, learning new parameters or updating parameter weighting to make the results of those models more accurate, more timely, etc. Updated or retrained models can be provided to user devices at a particular cadence, after an update, or the like for use in generating risk metrics, as described above, in real-time or near-real-time of a transaction between users.

In addition to the offline user device problems, including network connectivity problems, solved by the disclosed techniques, the systems and methods described herein alleviate security concerns surrounding performing risk assessments on personal information associated with users. Typically, transactional data from past transactions to which a user was a party are stored in a secure system that also performs the risk assessments, such as by one or more servers associated with a payment service. However, when connectivity issues occur between that payment service and user devices, performing such risk assessments on the user devices themselves would typically cause personal information to be exchanged between the user devices. This introduces a security concern that is alleviated by the disclosed techniques by utilizing embeddings that are computer-readable representations of personal information and that could not be readily reverse engineered to determine personal information. That is, the embeddings obfuscate personal information, which therefore makes the embeddings less useful to bad actors as they are not able to reverse engineer or otherwise manipulate the embeddings to access the encoded data.

Additionally, aside from security concerns that are mitigated by the use of embeddings as described herein, the use and processing of embeddings by user devices also provides the technical advantage of reducing storage and processing usage on those user devices. For example, absent the use of embeddings as described herein, if user characteristics data itself (i.e., the data on user characteristics as stored by a payment service) were stored and utilized, that data would be voluminous in comparison to its computer-readable representation corresponding to an embedding. For example, a swath of transaction information for a given user may include data indicating hundreds of transactions, payees, payment instruments, etc. Utilizing embeddings, that data can be represented as a set of numbers and/or letters that is smaller, sometimes much smaller, in file size. By so doing, the user devices can store embeddings utilizing less storage media on those user devices, and when the machine learning models process such data to generate risk metrics, such processing is minimized because the data being processed is less than if the user characteristics data was being input into the models. As such, the techniques described herein save on computing resources associated with multiple user devices associated with a payment service.

Furthermore, while certain functionality for performing offline transactions is made available, that functionality does not allow for bi-directional transactional evaluation assessments to be performed or for bi-directional digital signatures to be provided to ensure both users desire to proceed with a transaction. For example, if a user device that is offline as described above enters into a transaction with another user device, funds promised from one user account to the other user account are provided if, upon regaining connectivity, those funds are available in the user's stored balance account. However, utilizing the techniques described herein, user devices may generate a risk assessment for the other user and may be provided with the option to cancel or proceed with the transactions, giving both users a data-centric evaluation of the other user even while the user devices at issue are offline. Then, assuming both users desire to continue with the transaction, the user devices digitally sign data documenting the transaction such that when either of the user devices regain connectivity, the signed data can be used by the payment service in a way that clearly shows both users agreed to proceed with the transaction and the transaction data was not fraudulently generated and submitted by just one of the users.

With respect to examples where one or more of the user devices are not offline as defined above, utilizing the processes described herein may still be beneficial to make a given transaction more secure by allowing the user devices to exchange embeddings for the purpose of generating risk metrics. These risk metrics generated by the user devices may be compared to data received from the payment service to more accurately determine if a transaction should proceed or not. For example, the payment service may indicate that a payment instrument to be used for the transaction has been approved, but the risk metrics may indicate that the transaction is still risky with respect to the payee. In this scenario, even though the user devices are online, generation of the risk metric using the embeddings described herein may still be useful. Additionally, the process of using embeddings for generating risk metrics when the user devices are online may make an online transaction faster by, for example, eliminating or delaying transmission of data over a communication network for approval of the transaction. In still other examples, while the user devices may technically be online because the user devices are able to communicate with the payment service, the network may be slow, intermittent, or otherwise inconsistent such that the use of embeddings to generate on-device risk metrics would be beneficial. As such, even online transaction may be performed faster, utilizing less network bandwidth, and in a more secure manner by utilizing the exchanged embeddings between devices to generate risk metrics.

It should be noted that the exchange of data and/or information as described herein may be performed where a user has provided consent for the exchange of such information. For example, upon setup of user devices and/or initiation of applications, a user may be provided with the opportunity to opt in and/or opt out of data exchanges between user devices and/or for performance of the functionalities described herein. Additionally, when one of the user devices is associated with a first user account and another of the user devices is associated with a second user account, user consent may be obtained before performing some, any, or all of the operations and/or processes described herein. Additionally, the operations performed by the components of the systems described herein may be performed where a user has provided consent for performance of the operations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for offline data transfer utilizing on-device machine learning models, according to an embodiment described herein. The environment 100 of FIG. 1 may include a user 101 (*a*) associated with a user device 102(*a*), a user 101 (*b*) associated with a user device 102(*b*), and a payment service 104, which can communicate via network(s) 106. A user 101 (*a*), 101 (*b*) can be any user, but in examples the user 101 (*a*) may be described as a payor to a transaction, such as a customer, while the user 101 (*b*) may be described as a payee to a transaction, such as a merchant. The user devices can comprise one or more computing devices. Additional details associated with the user devices 102(*a*), 102(*b*), the payment service 104, and the network(s) 106 are described below with reference to FIGS. 8-12.

The user devices 102(*a*), 102(*b*) may include one or more components such as one or more processors 108, one or more network interfaces 110, computer-readable media (CRM) 112, one or more microphones 114, one or more speakers 116, one or more displays 118, and one or more cameras 119. The microphones 114 may be configured to receive audio input from the environment 100 and to generate corresponding audio data, which may be utilized as discussed herein. The speakers 116 may be configured to output audio, such as audio associated with a given transaction. The displays 118 may be configured to present graphical user interfaces. In some examples, the displays 118 can output images, videos, or the like via such graphical user interfaces. The cameras 119 may be configured to capture images and to generate corresponding image data.

The CRM 112 may include one or more applications or other components. For example, the one or more applications or other components can include one or more user interface(s) 120, a payment application 122, one or more machine learning models 124, and an offline component 126. A user interface 120 can be included in the payment application 122 as an interstitial, widget, or pop-up display.

The applications or other components may be configured to execute in the foreground and background of the user devices 102(*a*), 102(*b*). For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the user devices 102(*a*), 102(*b*) and/or with payment service 104 associated with the payment application 122. The payment application 122, running in the background, may be caused to be displayed in the foreground in response to selection of certain functionality on one or more applications utilized by the user devices 102(*a*), 102(*b*). In some such examples, the payment application 122 can transition to the foreground to perform payment operations or can remain in the background and payment operations can be performed without the payment application 122 transitioning to the foreground. It should be understood that the user interfaces 120 described herein may include the payment application 122 and may include one or more other user interfaces as described herein. It should also be understood that the payment application 122 or the functionality associated therewith can be integrated with other applications, such as third-party applications. Additional details on the machine learning models 124 and the offline component 126 are described below.

The payment service 104, which can be associated with one or more computing devices, such as server computing devices, may include components such as one or more processors 128, one or more network interfaces 130, and/or CRM 132. The CRM 132 may include one or more components such as, for example, datastore(s) 134, a communications component 136, one or more accounts 138, a payment component 140, one or more machine learning models 142, and one or more application programming interfaces (APIs) 144. These components will be described below by way of example.

In at least one example, the payment service 104 can expose functionality and/or services via the one or more APIs 144, thereby enabling functionality and/or services described herein to be integrated into various functional components of the environment 100. The API(s) 144, which can be associated with the payment service 104, can expose functionality described herein and/or avail payment services to various functional components associated with the environment 100. At least one of the API(s) 144 can be a private API, thereby availing services and/or functionalities to functional components (e.g., applications, etc.) that are developed internally (e.g., by developers associated with the payment service). At least one of the API(s) 144 can be an open or public API, which is a publicly available API that provides third-party developers (e.g., photograph platforms described herein) with programmatic access to a proprietary software application or web service of the payment service. That is, the open or public API(s) can enable functionality and/or services of the payment service to be integrated into one or more applications. The API(s) 144 can include sets of requirements that govern how applications, or other functional components, can interact with one another.

In some examples, the payment service 104 can provide third-party entities with a software developer kit ("SDK") that may utilize functionality exposed by the API(s) 144. The SDK can include software development tools that allow a third-party developer (i.e., a developer that is separate from the payment service) to include functionality and/or avail services as descried herein. The SDK and/or the API(s) 144 may include one or more libraries, programming code, executables, other utilities, and documentation that allows a developer to directly include functionality and/or avail services described herein within an application.

The datastore(s) 134 can store, among other types of data, user profiles. For instance, a user profile of the user can store payment data associated with payment instrument(s) or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include historical group data, geographic data, user preferences, subject matter preferences, transaction data, contacts data, social relationship data, user preferences, metadata tag data, and other information associated with participation in the transactions described herein. Additional details associated with data that can be stored in association with user profiles are provided below.

With respect to the other components of the user devices 102(*a*), 102(*b*) and the payment service 104, as described above, to make transactions more secure when operating in an offline environment, the user devices 102(*a*) and 102(*b*) can execute instances of the machine learning model(s) 124 on their respective user devices to perform a risk assessment. As described below, such a risk assessment can be based on embeddings provided by the communications component 136 of the payment service 104 and/or the payment app 122.

In an example, prior to the period of time when the user devices 102(*a*), 102(*b*) are offline, the communications component 136 of the payment service 104 may send embeddings to the user devices 102(*a*), 102(*b*), where the embeddings represents characteristics associated with a given user account 138. For example, periodically, such as once per day, once per several days, once per week, after an update, etc. the payment service 104 may utilize transaction data and other data, such as data retrieved from the datastores 134, associated with a given user account 138 and may utilize machine learning model(s) 142 to generate an embedding of characteristics determined from the transaction data and the other data. Examples of such characteristics may include an amount of time the user account 138 has been associated with the payment service 104, a payment type utilized in association with the user account 138, incidents of the user account 138 being deficient for a payment associated with the payment service 104, a frequency of interaction with the payment service 104 over a period of time, and a frequency of recurring deposits made to the user account 138, for example. While the payment service 104 could send data representing these characteristics without generating an embedding, the generation of an embedding reduces the risk that the data will be intercepted by a nefarious actor and be usable to harm the user in question. Instead, use of embeddings transforms the user account characteristics into a set of numbers or other representations that would be difficult for a nefarious actor to understand and utilize.

In some examples, the embeddings may be encrypted by the payment service 104 prior to sending. For example, the embeddings may be encrypted by the payment service 104 utilizing a private key designated for the payment service 104. This private key may be associated with a public key of the payment service 104 that may be utilized by the user devices 102(*a*), 102(*b*) to decrypt the encrypted embeddings. This layer of encryption allows the user devices 102(*a*), 102(*b*) to be able to decrypt only embeddings that are properly encrypted using the private key of the payment service 104, which may prevent or at least hinder the ability of a separate system or actor to nefariously generate and send false embeddings to the user devices. As such, a user device 102(*a*), 102(*b*) associated with the payment service 104 may access the encrypted data using the public key associated with the payment service 104, but if embeddings are received that are not encrypted using the private key of the payment service 104, the public key will not be able to decrypt these fraudulent embeddings, preventing those embeddings from being utilized to generate risk metrics. It should be understood that the payment service 104 may generate and send such embeddings to some or all of the user devices 102(*a*), 102(*b*) associated with some or all of the user accounts 138 associated with the payment service 104, which could number in the hundreds of thousands if not millions.

It should be understood that any methodology may be utilized for generating the embeddings described herein, but in examples the methodologies may include the use of the machine learning model(s) 142, including the use of neural networks, dimensionality reduction based on co-occurrence matrixes, probabilistic models, explainable knowledge base methods, etc. The goal with any of these methodologies is to transform data in its current form to a mathematical or at least numerical representation of that data that is difficult or impossible to reverse engineer without knowing the methodology that was utilized to perform the embeddings and without knowing the parameters of the methodology that was utilized. By so doing, an example user account characteristic such as "user account A: 2 missed payments across 524 made payments" can be embedded to "2316" or "af45k," just by way of example.

With respect to the embeddings themselves, portions of the embeddings may represent a given characteristic of a given user account 138. Examples of such characteristics may include an amount of time the user account 138 has been associated with the payment service 104, a payment type utilized in association with the user account 138, incidents of the user account 138 being deficient for a payment associated with the payment service 104, a frequency of interaction with the payment service 104 over a period of time, and a frequency of recurring deposits made to the user account 138, for example. To generate this portion of the embedding, the machine learning model 142 may query the datastores 134 for the transaction data and may utilize that transaction data to determine incidents defaults and the comparison of those defaults to other user accounts. The machine learning model 142 may then output a portion of the embedding, which may be a number or other representation of the default characteristic. This process may be repeated for other characteristics associated with a given user account 138. In some examples, the determination of which characteristics to determine for generating an embedding may be made by the machine learning model 142 over time as the machine learning model 142 learns what characteristics are most relevant to transaction risk metrics and from training data representing feedback from offline transactions and previously-generated risk metrics.

In examples, the portions of the embeddings that represent given characteristics of a given user account 138 may be combined and utilized to generate overall embeddings that are sent to user devices 102(*a*), 102(*b*) as described herein. When combining these embedding portions, the machine learning models 142 may also be utilized to determine how to perform these embedding combinations with a goal of reducing the ability of nefarious actors to reverse engineer the embeddings to recreate the user characteristics that the embeddings represent. As such, the combination of embedding portions may be performed dynamically and the combination process may change over time. It should also be understood that while in several examples used herein, some of the user characteristics are individually used to generate embedding portions that may be aggregated, some or all of the user characteristics data may be analyzed using the machine learning models 142 to generate an embedding, such as without generating embedding portions.

Additionally, as described herein and in some examples, the embeddings sent to the user devices 102(*a*), 102(*b*) may be encrypted by the payment service 104 before they are sent to the user devices 102(*a*), 102(*b*). The use of encryption at this stage in the process may be beneficial in that when the user devices 102(*a*), 102(*b*) receive the encrypted embeddings that can be decrypted with a public key associated with the payment service 104, the user devices 102(*a*), 102(*b*) may determine that the embeddings indeed were generated by the payment service 104, which is the only system authorized to encrypt such embeddings in association with that specific public key.

The user devices 102(*a*), 102(*b*) may receive the embeddings at steps 1 and 2 (represented by encircled numbers in FIG. 1), and store the embeddings on the user device if and until a transaction is to occur while the user devices 102(*a*), 102(*b*) are offline. It should be understood that while several examples provided herein describe performing certain operations when user devices to a transaction are offline, this disclosure includes the performance of some or all of such operations even in situations where the user devices are not offline (e.g., as an added layer of security to online transactions) and/or when one user device is offline and another is online. For example, a payor's device, user device 102(*a*), may be caused to display a user interface 120 for entering payment information or selecting payment instruments during a payment portion of a transaction. For example, the payment application 122 may be utilized to pay for an item from a payee 101 (*b*), and some of the functionality of the payment application 122 may be selection of predetermined payment instruments or methodologies, or input of information indicating a yet-to-be added payment instrument. Additionally, a payee's device, such as the user device 102(*b*) may be caused to display a user interface 120 for receiving the payment information or an approval of the selected payment instrument by the payor 101 (*a*). At this point, or at any other point associated with a transaction, the user devices 102(*a*), 102(*b*) of the payor 101 (*a*) and the payee 101 (*b*) may determine whether such user devices 102(*a*), 102(*b*) are offline with respect to the payment service.

For example, the offline component 126 of the user devices 102(*a*), 102(*b*) may be configured to detect one or more conditions predefined as being associated with an offline status. As described more fully herein, the user devices 102(*a*), 102(*b*) being offline may include the user devices 102(*a*), 102(*b*) losing connectivity to the payment service 104, a frequency of network traffic associated with the payment service 104 satisfying a threshold frequency of network traffic (e.g., network traffic at the payment service 104 being greater than typical such that the user devices 102(*a*), 102(*b*) cannot reliably communicate with the payment service 104), a response to a request to communicate with the payment service 104 not being received from the payment service 104, receiving an indication that the payment service 104 is not operating, and receiving an indication that a security risk is present with respect to communications from the user devices 102(*a*), 102(*b*) to the payment service 104, for example. When it is determined that the user devices 102(*a*), 102(*b*) associated with the transaction are offline and/or in other examples even when the user devices 102(*a*), 102(*b*) are online, the user devices 102(*a*), 102(*b*) may initiate a process for exchanging the embeddings that were received from the payment service 104 during an earlier period of time.

With respect to examples where one or more of the user devices 102(*a*), 102(*b*) are not offline as defined above, utilizing the processes described herein may still be beneficial to make a given transaction more secure by allowing the user devices 102(*a*), 102(*b*) to exchange embeddings for the purpose of generating risk metrics. These risk metrics generated by the user devices 102(*a*), 102(*b*) may be compared to data received from the payment service 104 to more accurately determine if a transaction should proceed or not. For example, the payment service 104 may indicate that a payment instrument to be used for the transaction has been approved, but the risk metrics may indicate that the transaction is still risky with respect to the payee. In this scenario, even though the user devices 102(*a*), 102(*b*) are online, generation of the risk metric using the embeddings described herein may still be useful. Additionally, the process of using embeddings for generating risk metrics when the user devices 102(*a*), 102(*b*) are online may make an online transaction faster by, for example, eliminating or delaying transmission of data over a communication network for approval of the transaction. In still other examples, while the user devices 102(*a*), 102(*b*) may technically be online because the user devices 102(*a*), 102(*b*) are able to communicate with the payment service 104, the network may be slow, intermittent, or otherwise inconsistent such that the use of embeddings to generate on-device risk metrics would be beneficial. As such, the processes described herein may be utilized for offline or online transactions, and the determination of whether user devices 102(*a*), 102(*b*) are offline or online may be made on a transaction-by-transaction basis. Or in other words, determining if user devices 102(*a*), 102(*b*) are offline or online may be made for individual transactions, and may not be (but could be) based on if the user devices 102(*a*), 102(*b*) have been placed in an offline mode or an online mode for a certain period of time.

To do so, the user device 102(*a*) may send the encrypted embedding, at steps 3 and 4 (as shown in encircled numbers in FIG. 1), to the user device 102(*b*) via a short-range communication protocol, such as Bluetooth®, NFC, RFID, etc. In some examples, a user can interact with a user interface element presented via the user interface 120 to cause the encrypted embedding to be sent to the other user device. In some examples, the two user devices can be moved to within a proximity such that the embeddings are transferred via the short-range communication protocol via a "tap." In some examples, when the user devices determine that they are offline from the payment service 104, a computer-readable representation (e.g., a QR code, a barcode, etc.) may be displayed on the user devices 102(*a*), 102(*b*), which may be configured to be captured by the other user devices 102(*a*), 102(*b*) to receive the encrypted embeddings. That is, the representation can be encoded with data, such as the encrypted embedding, that can be captured, parsed, read, and so on by another user device. For example, the user device 102(*a*) may display a first QR code or other readable code that may be captured by the user device 102(*b*), such as using a camera or scanning application. Additionally, the user device 102(*b*) may display a second QR code or other readable code that may be captured by the user device 102(*a*), such as using a camera or scanning application. The QR codes may include information that represents the encrypted user account characteristics embeddings. The user device 102(*b*) may then decrypt the encrypted embedding of the payor's user account characteristics utilizing a public key associated with the payment service 104 such that the payor's embedding is usable by the user device 102(*b*). Similarly, the user device 102(*b*) may send the payee's embedding to the user device 102(*a*), which may be decrypted on that user device 102(*a*) and used by that user device 102(*a*) to generate risk metrics as described herein.

At this point, the payor and the user devices 102(*a*), 102(*b*) may utilize the user account characteristics embeddings to generate, at steps 5 and 6 (as shown in encircled numbers in FIG. 1), a risk metric associated with the transaction at issue. To do so, the user account characteristics embedding as well as a transaction embedding indicating characteristics of the specific transaction at issue may be input into an on-device machine learning model 124 previously stored on the user devices 102(*a*), 102(*b*). For example, in the same or a similar manner as how the user account characteristics embeddings were sent to the user devices 102(*a*), 102(*b*) prior to the user devices being offline from the payment service 104, the payment service 104 may also generate and send, via the communications component 136, data representing the machine learning models 124 to be used for risk metric generation. The on-device machine learning models 124 may be configured to receive the embeddings as sent by the payment service 104 to other user devices. That is, the on-device machine learning model(s) 124 on a first user device may be configured to receive an embedding sent by the payment service 104 to a second user device, via a scan, tap, or the like, as described above. The machine learning model 124 on the first user device then interprets portions of the embedding from the second user device to determine the user account characteristics associated with the user associated with the second user device. With respect to the transaction characteristics embeddings, such characteristics may include details about the transaction at issue that may impact the risk metric. Such characteristics may include users involved in the transaction, an amount of funds associated with the transaction, a type of item being sold in the transaction (if any), a day/time of the transaction, software and hardware of the user devices being used, etc.

Those on-device machine learning models 124 may intake the user account characteristics embedding for the payor 101 (*a*) as well as the transaction characteristics embedding for the transaction and may produce, as output, a risk metric indicating a likelihood that the payment instrument selected by the payor will be successfully used to transfer funds to the payee 101 (*b*). Likewise, the user device 102(*a*) may produce its own risk metric of the payee 101 (*b*), particularly where the item to be purchased may not necessarily be physically available to the payor at the time of purchase. It should be understood that while in this example a risk metric is generated for both parties to the transaction, in other examples only a single risk metric may be generated and only a single user selection to continue with the transaction may be utilized to effectuate the transaction. For example, the transaction may involve the purchase of a physically-present item from a payee. In this example, the payor will acquire the physically-present item and thus may not have to see whether the transaction will be successful (in other words, the acquisition of the physically-present item means the transaction was successful from the point of view of the payor). However, the payee may still receive a risk metric because the funds to be used to pay for the item cannot be confirmed or transferred when the user devices 102(*a*), 102(*b*) at issue are offline. As such, the user device 102(*b*) may generate a risk metric associated with the user account characteristics of the payor 101 (*a*).

The risk metric itself may take many forms as described in more detail herein, however, for the sake of illustration, the risk metric may include an indication that the transaction is low risk, medium risk, or high risk. In other examples, the risk metric may quantify the riskiness of the transaction where the risk metric is placed on a scale, such as a scale from 1 to 100 with 1 being very risky and 100 being least risky. The risk metrics may then be displayed using a user interface 120 of the payment application 122 on the payee and payor devices, such as the user devices 102(*a*), 102(*b*), and in some examples, may be presented along with functionality for selecting whether to continue with or cancel the transaction based on the risk metric. Such functionality may be in the form of an interactive element that, when selected, either causes the user device 102(*a*) to perform operations that continue effectuating the transaction or to perform operations that ensure the transaction does not proceed.

In examples where the parties to a given transaction provide user input data indicating a selection to continue with the transaction, one of the user devices 102(*a*), 102(*b*) associated with the transaction may digitally sign data documenting the transaction. That digitally signed data may be sent to the other user device(s) 102(*a*), 102(*b*) associated with the transaction, and those user device(s) 102(*a*), 102(*b*) may also digitally sign the data documenting the transaction and return the co-signed data to the other user devices 102(*a*), 102(*b*) in the transaction such that user devices 102(*a*), 102(*b*) have a fully digitally signed instance of the data documenting the transaction. This data signing may include appending data representing a digital signature to the transaction documentation data until the digital signatures of the user devices 102(*a*), 102(*b*) at issue have been acquired.

Then, at some point after the transaction is concluded as between the offline user devices 102(*a*), 102(*b*), at steps 7 and 8 (as shown in encircled numbers in FIG. 1), one or more of the user devices 102(*a*), 102(*b*) may regain connectivity to the payment service 104 or otherwise may transition from not being offline. At this point, the now online user device 102(*a*), 102(*b*) may send an instance of the digitally signed data documenting the transaction to a payment component 140 of the payment service 104, which may perform operations to effectuate the transaction by seeking to approve the payment instrument of the payor 101 (*a*) and provide indications of payment to the payor 101 (*a*) and payee 101 (*b*). It should be understood that in some instances the payment component 140 of the payment service 104 may still deny the payment instrument of the payor 101 (*a*) if such a payment instrument is deficient in some manner.

Using this risk assessment methodology, the payment service 104 may receive the co-signed transaction documentation data from one of the user devices 102(*a*), 102(*b*) to the transaction to proceed with the transaction. However, in some instances more than one of the user devices 102(*a*), 102(*b*) to the transaction may become online with respect to the payment service 104. In these instances, the payment component 140 of the payment service 104 may determine whether a given transaction has already been effectuated (in instances where one user device 102(*a*), 102(*b*) comes online prior to another of the user devices 102(*a*), 102(*b*)), and may determine to refrain from again effectuating an already-concluded transaction.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
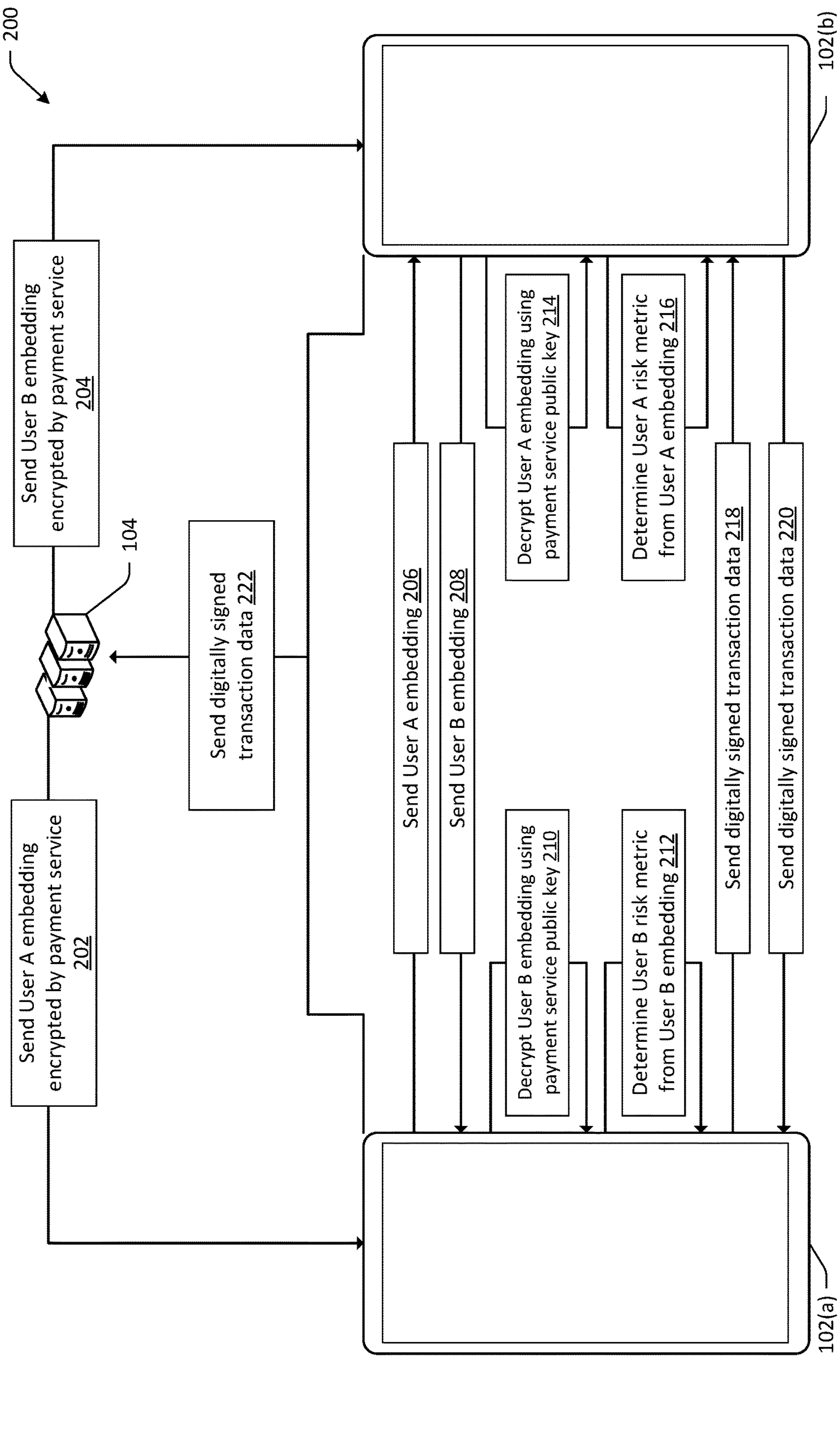
FIG. 2 is an example environment for transmission of encrypted embeddings between a payment service and two user devices, and between the two user devices, according to an embodiment described herein.

FIG. 2 is an example environment 200 for transmission of encrypted embeddings between a payment service 104 and two user devices 102(*a*), 102(*b*), and between the two user devices 102(*a*), 102(*b*), according to an embodiment described herein. The payment service 104 may include the same or similar components as those described with respect to FIG. 1. Additionally, the user devices 102(*a*), 102(*b*) may include the same or similar components as those described with respect to FIG. 1.

At step 202, the payment service 104 may send User A's embedding as encrypted by the payment service 104. For example, as described in more detail above, the payment service 104 may periodically or otherwise send an embedding of characteristics of user accounts, including a user account associated with User A. In examples, the embedding of the user account characteristics may be encrypted by the payment service 104 such that, when received at the user devices 102(*a*), 102(*b*), the user devices 102(*a*), 102(*b*) may be able to decrypt the user account characteristics embeddings and determine that the embeddings were generated by the payment service 104 instead of another computing device related to another entity, such as a nefarious actor.

At block 204, the payment service 104 may send User B's embedding as encrypted by the payment service 104. This operation may be performed in the same or a similar manner as described with respect to block 202, except that the embedding in question is for the user account characteristics associated with User B.

At block 206, User A's embedding may be sent from the user device, corresponding to the user device 102(*a*), to Device B, corresponding to the user device 102(*b*). For example, when a transaction is initiated or at any point during or before a transaction, the user devices 102(*a*), 102(*b*) may determine that they are offline or otherwise cannot perform operations associated with a typical transaction that involves the payment service 104. When such a determination is made, a process may be initiated for generating and displaying risk metrics associated with the transaction at issue on the user devices 102(*a*), 102(*b*). While the example of FIG. 2 shows two risk metrics being generated, one for User A and User B, it should be understood that only a single risk metric may be generated for one of the users involved in the transaction.

Thereafter, the embedding may be sent from the user device 102(*a*) to the user device 102(*b*). In some examples, a short range communication protocol such as Bluetooth® may be utilized to communicate the encrypted user account characteristics embeddings between user devices. In other examples, a QR code or otherwise, such as a near field communication (NFC) component, may be utilized to transfer the user account characteristics embeddings between user devices 102(*a*), 102(*b*).

At block 208, User B's embedding may be sent from the user device 102(*b*) to the user device 102(*a*). This operation may be performed in the same or a similar manner as described with respect to block 206, except that User B's embedding may be sent from the user device 102(*b*) to the user device 102(*b*).

At block 210, the user device 102(*a*) may decrypt User B's embedding utilizing a public key associated with the payment service 104. For example, the user device 102(*a*), having received or otherwise having available to it the public key associated with payment service 104, may utilize that public key to decrypt the encrypted user account characteristics embedding such that the embedding can be utilized by the user device 102(*a*) to generate a risk metric associated with User B.

At block 212, the user device 102(*a*) may determine a risk metric associated with User B along with, in examples, a transaction embedding indicating characteristics of the transaction at issue. To do so, the user account characteristics embedding as well as a transaction embedding indicating characteristics of the specific transaction at issue may be input into an on-device machine learning model previously stored on the user device 102(*a*). For example, in the same or a similar manner as how the user account characteristics embeddings were sent to the user devices 102(*a*), 102(*b*) prior to the user devices being offline from the payment service 104, the payment service 104 may also generate and send, via the communications component 136, data representing the machine learning models to be used for risk metric generation. The on-device machine learning models may be configured to receive the embeddings as sent by the payment service 104 and to interpret the portions of the embeddings to determine the user account characteristics. With respect to the transaction characteristics embeddings, such characteristics may include details about the transaction at issue that may impact the risk metric. Such characteristics may include users involved in the transaction, an amount of funds associated with the transaction, a type of item being sold in the transaction (if any), a day/time of the transaction, software and hardware of the user devices being used, etc.

Those on-device machine learning models may intake the user account characteristics embedding for User B as well as the transaction characteristics embedding for the transaction and may produce, as output, a risk metric indicating a likelihood that the transaction will proceed successfully and be authorized. The risk metric itself may take many forms as described in more detail herein, however, for the sake of illustration, the risk metric may include an indication that the transaction is low risk, medium risk, or high risk. In other examples, the risk metric may quantify the riskiness of the transaction where the risk metric is placed on a scale, such as a scale from 1 to 100 with 1 being very risky and 100 being least risky. The risk metrics may then be displayed using a user interface of the user device 102(*a*) along with functionality for selecting whether to continue with or cancel the transaction based on the risk metric. Such functionality may be in the form of an interactive element that, when selected, either causes the user device 102(*a*) to perform operations that continue effectuating the transaction or to perform operations that ensure the transaction does not proceed.

At block 214, the user device 102(*b*) may decrypt User A's embedding utilizing a public key associated with payment service 104. This operation may be performed in the same or a similar manner as described with respect to block 210, except that User A's embedding may be decrypted utilizing a public key associated with the payment service.

At block 216, the user device 102(*b*) may determine a risk metric associated with User A along with, in examples, a transaction embedding indicating characteristics of the transaction at issue. This operation may be performed in the same or a similar manner as described with respect to block 212, except that the risk metric may be associated with User A.

At block 218, the user device 102(*a*) may send digitally signed transaction data to the user device 102(*a*). When user input data has been received from both the user device 102(*a*) and the user device 102(*b*), or just one of those user devices in a situation where only a single risk metric is generated, the user device 102(*a*) may generate transaction data indicating details of the transaction to be sent to the payment service 104 to effectuate the transaction. That transaction data may be digitally signed by the user device 102(*a*), indicating that the user input data has been received that User A is willing to continue with the transaction in light of the risk metric associated with the transaction. The digitally signed transaction data may then be sent to Device B 102(*b*).

At block 220, Device B 102(*b*) may co-sign the transaction data and may send the co-signed transaction data to the user device 102(*a*). For example, having received the user input data indicating User B is willing to continue with the transaction in light of the risk metric associated with the transaction, Device B 102(*b*) may co-sign the transaction data such that parties to the transaction have acknowledged that the transaction will proceed. Device B 102(*b*) may then store the co-signed transaction data such that the data may be queried when Device B 102(*b*) comes online with respect to the payment service 104. Device B 102(*b*) may also send the co-signed transaction data to the user device 102(*a*), which may store the co-signed transaction data to be queried when the user device 102(*a*) comes online.

At block 222, the user device 102(*a*) or the user device 102(*b*) may send the digitally signed transaction data to the payment service 104, which may effectuate the transaction. For example, one or more conditions that prevented communication (or reliable communication) with the payment service 104 may abate such that the user device 102(*a*) or the user device 102(*b*) can send the co-signed transaction data to the payment service 104. Having received the transaction data from one or both of the user device 102(*a*) and the user device 102(*b*), the payment service 104 may effectuate the transaction by attempting to authorize the transaction to proceed. In examples, the co-signed transaction data may be transferred to the payment service 104 by a third device and/or in a chain of devices, and neither of the user device 102(*a*) and the user device 102(*b*) may directly send the co-signed transaction data to the payment service 104.

It should be understood that while each of the operations described above are described as being performed in association with the process 200, one or more of these operations may be optional and may not be performed.

Figure 3:
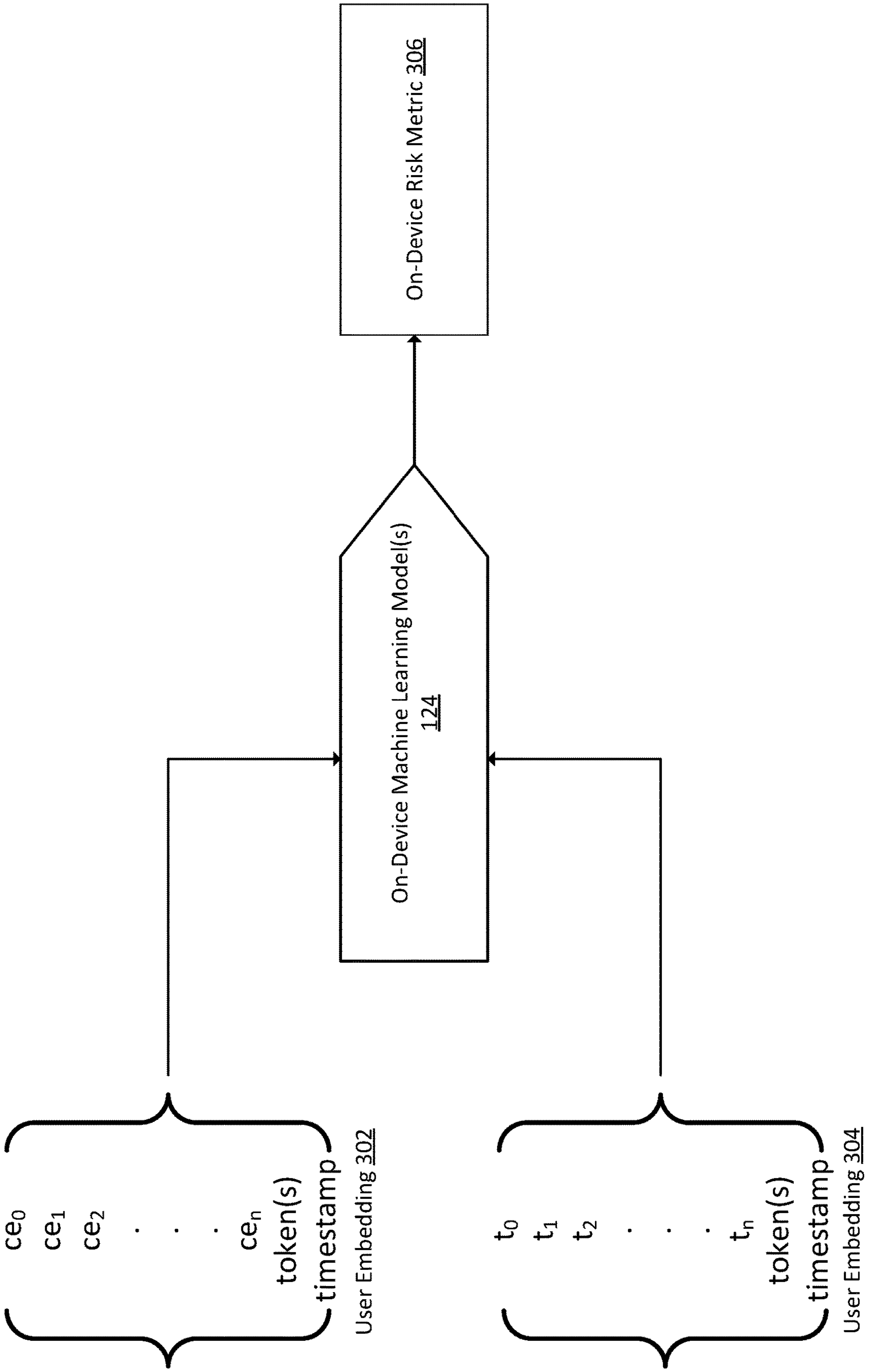
FIG. 3 is a conceptual diagram of example embeddings of user account information and transaction information as input into an on-device machine learning model for generating risk metrics, according to an embodiment described herein.

FIG. 3 is a conceptual diagram of example embeddings 302, 304 of user account information and transaction information as input into an on-device machine learning model 124 for generating risk metrics 306, according to an embodiment described herein.

As described above, user account characteristics may be embedded by a payment service and that payment service may send the user account characteristics embeddings 302 to user devices associated with respective user accounts. Thereafter, such as when user devices to a transaction are offline with respect to the payment service, the user devices may exchange user account characteristics embeddings 302. Additional details on the exchange of user account characteristics embeddings 302 being exchanged are provided above, but generally a given user device involved in a transaction may receive user account characteristics embeddings 302 for the other user accounts associated with the transaction (which will typically be just one embedding 302 but may be multiple embeddings 302 if the transaction involves more than one payee or more than one payor).

The user account characteristics embedding 302 may include representations of the characteristics, such as numbers, symbols, etc. Examples of such characteristics may include an amount of time the user account has been associated with the payment service, a payment type utilized in association with the user account, incidents of the user account being deficient for a payment associated with the payment service, a frequency of interaction with the payment service over a period of time, and a frequency of recurring deposits made to the user account, for example. To generate this portion of the embedding, the machine learning model at the payment service may query datastores for transaction data and may utilize that transaction data to determine the incidents defaults and the comparison of those defaults to other user accounts. The machine learning model may then output a portion of the embedding, which may be a number or other representation of the characteristic. This process may be repeated for other characteristics associated with a given user account. In some examples, the determination of which characteristics to determine for generating an embedding may be made by the machine learning model over time as the machine learning model learns what characteristics are most relevant to transaction risk metrics and from training data representing feedback from offline transactions and previously-generated risk metrics.

Additional characteristics may include when the last embedding was received at the given user device, a frequency at which embeddings are received, a frequency at which offline transactions are performed, etc. The embeddings 302 may also include a timestamp indicating when the embedding 302 was generated at the payment service or when the embedding 302 was received at the user device in question. The embeddings 302 may also include one or more token, which may be utilized to identify the embeddings 302 and as a security mechanism for the user devices at issue to determine that the embeddings 302 are the appropriate embeddings for the transaction at issue (e.g., that the embeddings 302 relate to the user accounts associated with the transaction).

In addition to the user account characteristics embeddings 302, a transaction embedding 304 may be generated for transaction characteristics of the transaction at issue. With respect to the transaction embeddings 304, such characteristics may include details about the transaction at issue that may impact the risk metric. Such characteristics may include users involved in the transaction, an amount of funds associated with the transaction, a type of item being sold in the transaction (if any), a day/time of the transaction, software and hardware of the user devices being used, etc. The transaction embedding 304 may also include one or more tokens as described above along with a timestamp indicating when the transaction embeddings 304 were generated or otherwise to indicate that the transaction embedding 304 is associated with the transaction at issue.

Once the user account characteristics embedding 302 and the transaction embedding 304 are identified, the embeddings 302, 304 may be input into an on-device machine learning model 124 configured to generate risk metrics 306. The on-device machine learning models 124 may be configured to interpret the portions of the embeddings 302, 304 to determine the user account characteristics and the transaction characteristics without actually having to ingest data that includes those characteristics. By so doing, only the machine learning model 124 knows, and only for the time when it is processing the embeddings 302, 304, what the user account characteristics and the transaction characteristics are. This provides a very small attack surface for nefarious actors to gain access to those characteristics.

Those on-device machine learning models 124 may output a risk metric 306 indicating a likelihood that the transaction will proceed successfully and be authorized. The risk metric 306 itself may take many forms as described in more detail herein, however, for the sake of illustration, the risk metric 306 may include an indication that the transaction is low risk, medium risk, or high risk. In other examples, the risk metric 306 may quantify the riskiness of the transaction where the risk metric 306 is placed on a scale, such as a scale from 1 to 100 with 1 being very risky and 100 being least risky. The risk metrics 306 may then be displayed using a user interface of the user devices associated with the transaction along with functionality for selecting whether to continue with or cancel the transaction based on the risk metric 306. Such functionality may be in the form of an interactive element that, when selected, either causes the user devices to perform operations that continue effectuating the transaction or to perform operations that ensure the transaction does not proceed. It should be understood that a risk metric 306 displayed to a first participant in a transaction may differ from another risk metric 306 displayed to a second participant in the same transaction. This is because the characteristics of the various users involved in a transaction will likely vary, and while the transaction characteristics may be the same, the user account characteristics may indicate more or less risk that the transaction will proceed successfully from the point of view of various users involved in the transaction.

Figure 4:
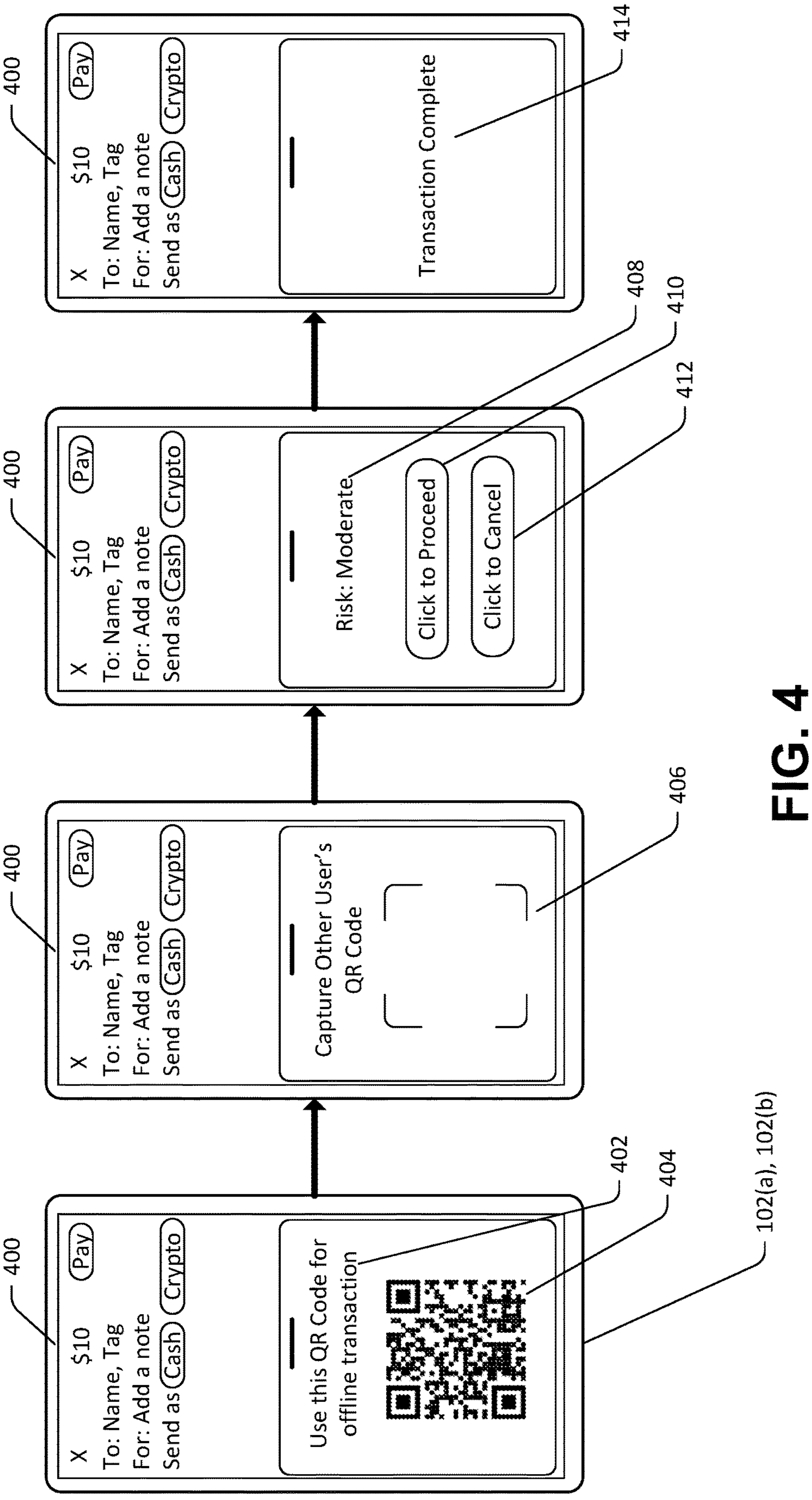
FIG. 4 is an example of how a user interface as displayed on a user device may be updated during offline data transfer utilizing on-device machine learning models, according to an embodiment described herein.

FIG. 4 is an example of how a user interface 400 as displayed on a user device 102(*a*), 102(*b*) may be updated during offline data transfer utilizing on-device machine learning models, according to an embodiment described herein. The user interface 400 may be one of the user interfaces 120 described with respect to FIG. 1. Additionally, the user interface 400 may be displayed in association with the payment application 122 as described with respect to FIG. 1. Furthermore, the user devices 102(*a*), 102(*b*) may be the same as or similar to the user devices 102(*a*), 102(*b*) described with respect to FIG. 1. It should be understood that FIG. 4 illustrates a progression of the user interface 400 from left to right.

As described in more detail above, a transaction may be initiated between two or more users associated respective user accounts. Prior to the transaction being initiated, the user devices associated with the transaction may have received a user account characteristics embedding from a payment service associated with the users. Then, at some point during or prior to the transaction at issue, the user devices involved in the transaction may determine that they are offline with respect to the payment service. In these offline examples, a process for exchanging the embeddings between user devices may be initiated.

When this occurs, the user interface 400 may be caused to display an offline indication 402, which may provide the user with an indication that the transaction will be conducted as an offline transaction and that additional input and processes are to be performed that differ from a typical online transaction. The user interface 400 may also include a QR code 404 or other scannable element that may be utilized to communicate the user account characteristics embedding associated with that user device to another user device associated with the transaction. In other examples, a short-range communication protocol may be utilized to exchange embeddings. A user of the other user device to the transaction may then scan the QR code 404 to acquire the embedding from the user device displaying the QR code 404.

In addition to this mechanism for sharing an embedding, the user interface 400 may display a capture element 406 configured to be utilized to capture a QR code from another user device associated with the transaction. The capture element 406 may include a narrative explaining how to capture the QR code as well as a guide to be utilized to situate a camera of the user device to accurately capture the QR code displayed on the other user device.

Once embeddings are exchanged, the user devices may each (in examples) generate a risk metric associated with the transaction and may display a risk metric indicator 408 via the user interface 400. The risk metric indicator 408 shown in FIG. 4 indicates that the risk of the transaction not proceeding successful is "moderate" as compared to "low" or "high." It should be understood that these risk metric indicators 408 as shown in FIG. 4 are utilized for illustrative purposes and not as a limitation. The risk metric indicators 408 may provide any indication of transaction risk. Additionally, the user interface 400 may display a first interactive element 410 to proceed with the transaction and a second interactive element 412 to cancel the transaction in light of the risk metric. These interactive elements 410, 412 may be selectable to either cause the transaction to proceed or to cancel the transaction.

User input data may be received that indicates selection of one of the interactive elements 410, 412. When the users involved in the offline transaction have provided user input data indicating that the transaction should proceed, additional operations such as digital signing of transaction data as described in more detail here may be performed, and when complete the user interface 400 may display a transaction status 414. In this example where the user input data indicated selection of the first interactive element 410 to proceed with the transaction, the transaction may be effectuated and the transaction status 414 may indicate that the transaction is complete. Other transaction statuses 414 may include an indication that a transaction is pending, that the transaction has been canceled, or that the user device is awaiting a response from the other user device involved in the transaction, for example.

Figure 5:
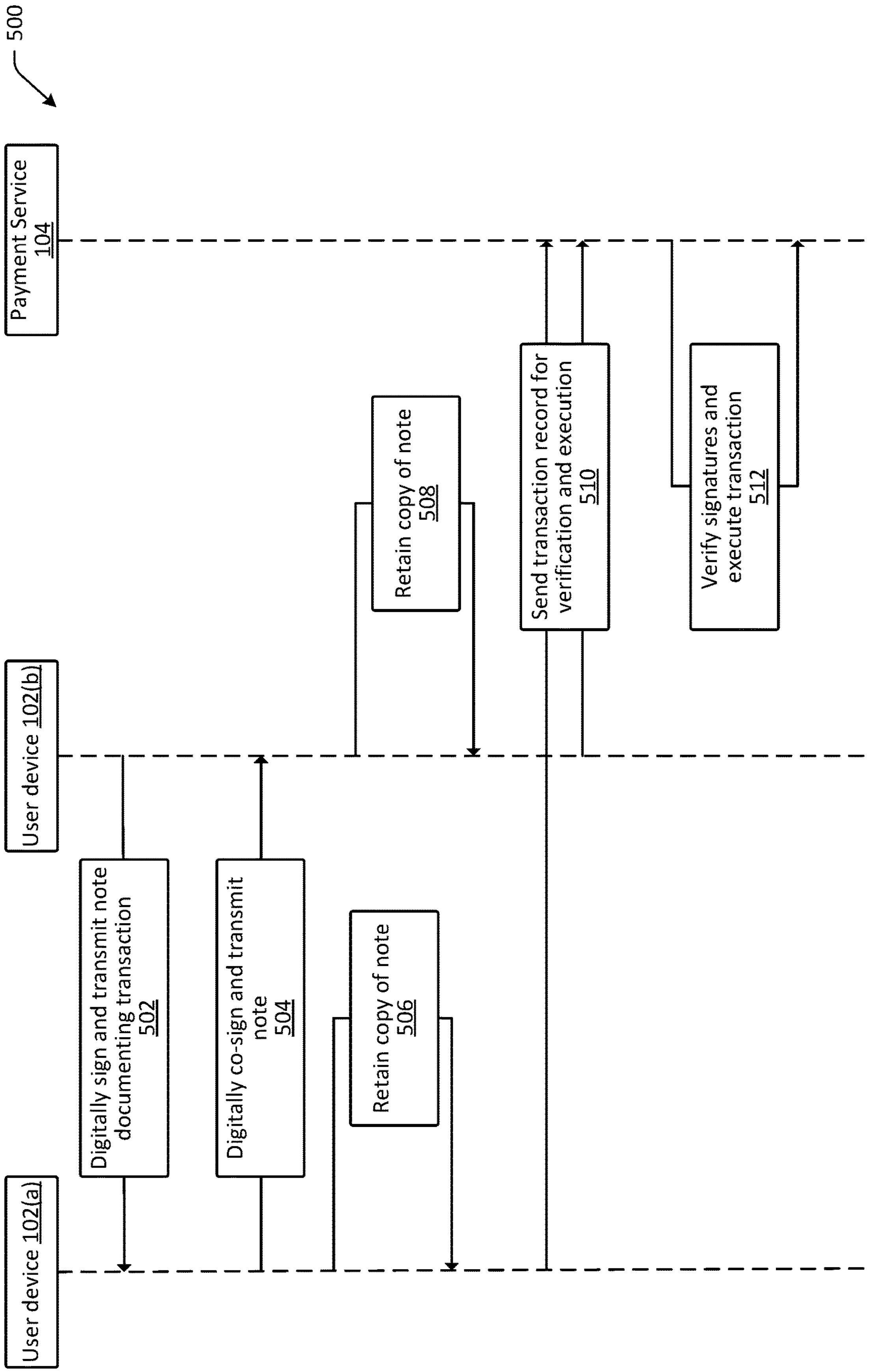
FIG. 5 is an example sequence diagram showing a process for exchanging and using embeddings for completing an offline transaction, according to an embodiment described herein.
Figure 6:
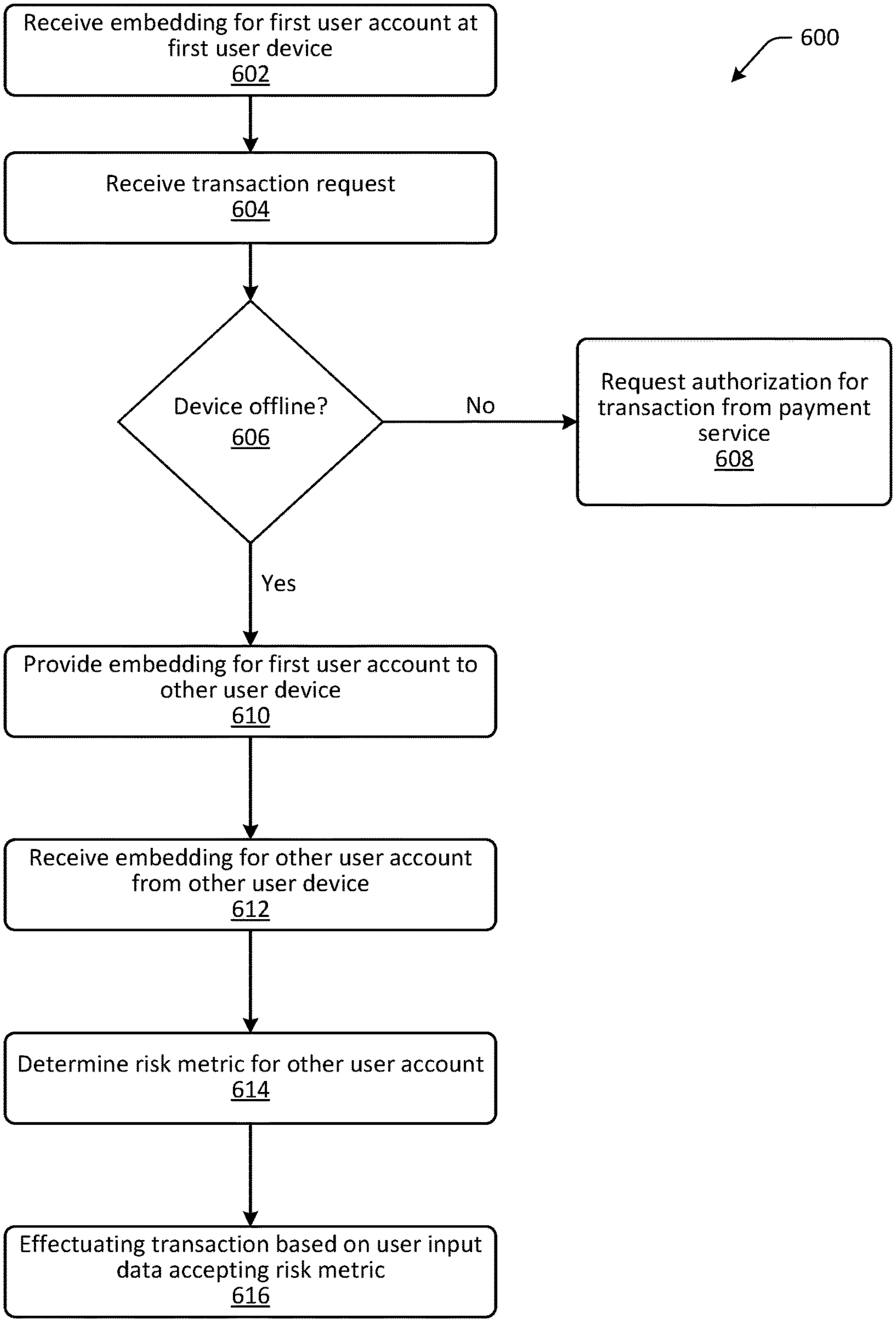
FIG. 6 is a flow diagram of an example process for offline data transfer utilizing on-device machine learning models, according to an embodiment described herein.
Figure 7:
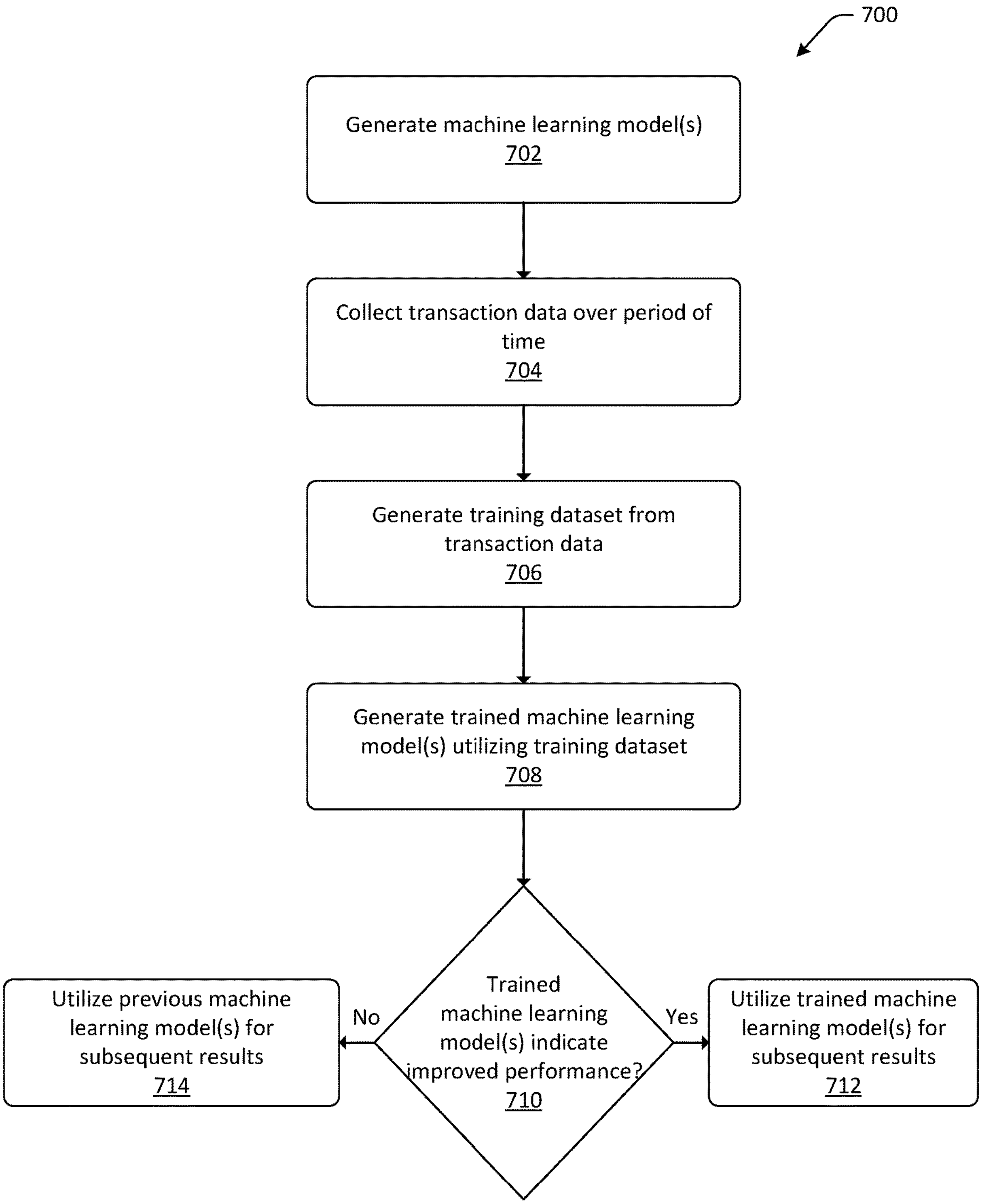
FIG. 7 is a flow diagram of an example process for utilizing machine learning in association with operations performed by a payment service and one or more user devices, according to an embodiment as described herein.

FIGS. 5-7 are example processes for offline data transfer utilizing on-device machine learning models. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks may be executed. For discussion purposes, the processes are described with reference to the environments, architectures and systems described in the examples herein, such as, for example those described with respect to FIGS. 1-4 and 8-12, although the processes may be implemented in a wide variety of other environments, architectures and systems.

FIG. 5 is an example sequence diagram showing a process 500 for exchanging and using embeddings for completing an offline transaction, according to an embodiment described herein. The process 500 may involve user device 102(*a*), user device 102(*b*), and a payment service 104, which are described in more detail with respect to FIG. 1.

At block 502, the process 500 may include user device 102(*b*) digitally signing and transmitting a note documenting a given transaction. As described above, user account characteristics embeddings and transaction embeddings may be utilized by on-device machine learning models to generate risk metrics for a transaction. When user input data is received indicating a desire to continue with a transaction in light of those risk metrics, the user devices 102(*a*), 102(*b*) may initiate a process for effectuating the transaction. To do so, one of the user devices, here user device 102(*b*) may digitally sign a note documenting the transaction. The note may include details about the transaction, the risk metric(s), the user accounts at issue, etc. Once digitally signed, the note may be sent to the other user device(s) in the transaction, here user device 102(*a*) to be co-signed by user device 102(*a*).

At block 504, the process 500 may include user device 102(*a*) digitally co-signing the note and transmitting the note and, in some examples, information associated with the generated risk metric, to user device 102(*b*). Co-signing of the note may be performed in the same or a similar manner as digitally signing the note as described with reference to block 502. This process may be continued until the user device(s) that are involved in the offline transaction have signed the note and the user devices have a fully signed version of the note.

At block 506, the process 500 may include user device 102(*a*) retaining a copy of the note as co-signed. For example, user device 102(*a*) may store an instance of the note as co-signed in a database or in a cache of the user device along with an identifier of the transaction and data indicating that the transaction was an offline transaction that is to be sent to the payment service 104 when user device 102(*a*) comes back online with respect to the payment service 104.

At block 508, the process 500 may include user device 102(*b*) retaining a copy of the note as co-signed. This operation may be performed in the same or a similar manner as described with respect to block 506, except that user device 102(*b*) may store the instance of the note as co-signed.

At block 510, the process 500 may include user device 102(*a*) or user device 102(*b*) sending a transaction record including the co-signed note to the payment service 104. For example, as described in more detail above, user device 102(*a*) or user device 102(*b*) may come online with respect to the payment service 104 such that the digitally signed note may be transmitted to the payment service 104. It should be understood that either or both of the user devices may come online and may send the digitally signed note at the same or a similar time, or at different times.

At block 512, the process 500 may include the payment service 104 verifying the digital signatures from the note and executing the transaction. Verifying the digital signatures may include determining that the digital signatures were signed in association with a user device that is registered to the user accounts that are a part of the transaction and that the digital signature is in a predefined form. Executing the transaction may include requesting authorization for a payment instrument to be utilized to transfer funds from one account to another, and when granted, performing the transfer of funds.

FIG. 6 is a flow diagram of an example process 600 for offline data transfer utilizing on-device machine learning models, according to an embodiment described herein. The order in which the operations or steps are described is not intended to be construed as a limitation, and any number of the described operations may be combined in any order and/or in parallel to implement process 600.

At block 602, the process 600 may include receiving an embedding for a first user account at a first user device. For example, as described in more detail above, a payment service may periodically or otherwise send an embedding of characteristics of user accounts. In examples, the embedding of the user account characteristics may be encrypted by the payment service such that, when received at user devices, the user devices may be able to decrypt the user account characteristics embeddings and determine that the embeddings were generated by the payment service instead of another computing device related to another entity, such as a nefarious actor. By so doing, user account characteristics data may be transferred between computing devices in an embedded and encrypted fashion, leading to increased security for such information.

At block 604, the process 600 may include receiving a transaction request. The transaction request may be received from a payor device and/or a payee device and may indicate that at least one of the users of these user devices has provided user input data to initiate a transaction as between the payor and the payee. The transaction request may include a type of transaction (e.g., peer-to-peer transaction, customer-to-merchant transaction, cryptocurrency transaction, etc.). Based at least in part on receiving the transaction request, one or more of the user devices may initiate a process for determining a payment instrument to be utilized and for determining the user accounts at issue for the transaction.

At block 606, the process 600 may include determining whether the user device at issue is offline. For example, a payor's device may be caused to display a user interface for entering payment information or selecting payment instruments during a payment portion of a transaction. Additionally, a payee's device may be caused to display a user interface for receiving the payment information or an approval of the selected payment instrument by the payor. At this point, or at any other point associated with a transaction, the user devices of the payor and the payee may determine whether such user devices are offline with respect to the payment service. As described more fully herein, the user devices being offline may include the user devices having lost connectivity to the payment service, an amount of traffic handled by the payment service being too high, etc. Once it is determined that the user devices associated with the transaction are offline, the user devices may initiate a process for exchanging the embeddings that were received from the payment service during an earlier period of time. While in typical payment processes an offline scenario would result in a transaction not proceeding or the parties to the transaction proceeding without authorization from the payment service, the techniques described herein can detect when an offline condition is present and initiate a computer-centric process of generating a risk metric to be utilized during the transaction.

In examples where the user device is not offline, the process 600 may include, at block 608, requesting authorization for the transaction from a payment service. In this example, at least one of the user devices associated with a given transaction is online with respect to the payment service and thus can request authorization for the transaction to be effectuated. Based on this, a request for authorization may be sent to the payment service, and the payment service may determine whether to approve the transaction. When approved, a response may be sent to the online user device(s) indicating that approval and the transaction may be effectuated. When not approved, a response may be sent to the online user device(s) indicating that the transaction is declined.

In examples where the user device is offline, the process 600 may include, at block 610, providing an embedding for the first user account to another user device. For example, a process may be initiated for generating and displaying risk metrics associated with the transaction at issue on the user devices. The embedding may be sent using a short range communication protocol or by presenting a QR code or other scannable element that, when scanned by the other user device, can be utilized to extract the embedding.

At block 612, the process 600 may include receiving an embedding for the other user account from the other user device. The process of receiving the embedding from the other user device may be performed in the same or a similar manner as how the other user device received the first embedding, as described with respect to block 608.

At block 614, the process 600 may include determining a risk metric for the other user account. To do so, the user account characteristics embedding as well as a transaction embedding indicating characteristics of the specific transaction at issue may be input into an on-device machine learning model previously stored on the user device in question. For example, in the same or a similar manner as how the user account characteristics embeddings were sent to the user devices prior to the user devices being offline from the payment service, the payment service may also generate and send data representing the machine learning models to be used for risk metric generation. The on-device machine learning models may be configured to receive the embeddings as sent by the payment service and to interpret the portions of the embeddings to determine the user account characteristics. With respect to the transaction characteristics embeddings, such characteristics may include details about the transaction at issue that may impact the risk metric. Such characteristics may include users involved in the transaction, an amount of funds associated with the transaction, a type of item being sold in the transaction (if any), a day/time of the transaction, software and hardware of the user devices being used, etc.

Those on-device machine learning models may intake the user account characteristics embedding as well as the transaction characteristics embedding for the transaction and may produce, as output, a risk metric indicating a likelihood that the transaction will proceed successfully and be authorized. The risk metric itself may take many forms as described in more detail herein, however, for the sake of illustration, the risk metric may include an indication that the transaction is low risk, medium risk, or high risk. In other examples, the risk metric may quantify the riskiness of the transaction where the risk metric is placed on a scale, such as a scale from 1 to 100 with 1 being very risky and 100 being least risky.

At block 616, the process 600 may include effectuation the transaction based on user input data accepting the risk metric. For example, the risk metrics may be displayed using a user interface of the user device along with functionality for selecting whether to continue with or cancel the transaction based on the risk metric. Such functionality may be in the form of an interactive element that, when selected, either causes the user device in question to perform operations that continue effectuating the transaction or to perform operations that ensure the transaction does not proceed.

Additionally, or alternatively, the process 600 may include determining, from the second characteristics, a how recently the second embedding was received at the second user device from the payment service. In these examples, determining the risk metric may be based at least in part on how recently the second embedding was received at the second user device.

Additionally, or alternatively, the process 600 may include the first embedding and the second embedding representing data generated by the payment service utilizing a machine learning model configured to determine the first characteristics and the second characteristics from first transaction data associated with the first user account and second transaction data associated with the second user account. Additionally, the first encrypted data and the second encrypted data may include an indication that the first encrypted data and the second encrypted data has been encrypted by the payment service such that only the payment service has authority to produce the encryptions.

Additionally, or alternatively, the process 600 may include receiving user input data requesting to effectuate the transaction based on the analyzing the second embedding. The process 600 may also include determining that the other user device has received an indication that the transaction should be effectuated based on an analysis of the first embedding performed on the other user device. In these examples, effectuating the transaction may be based at least in part on receiving the user input and determining that the other user device has received the indication.

Additionally, or alternatively, the process 600 may include receiving user input data requesting to effectuate the transaction based on the analyzing the second embedding. The process 600 may also include determining that the first embedding was not sent to the other user device. In these examples, effectuating the transaction may be based at least in part on receiving the user input and determining that the first embedding was not sent to the other user device.

Additionally, or alternatively, the process 600 may include, based at least in part on initiating the transaction, causing a first QR code to be displayed on the user device. The process 600 may also include receiving data representing a second QR code displayed on the other user device and captured by the user device. In these examples, exchanging the first embedding may be performed utilizing the first QR code and exchanging the second embedding may be performed utilizing the second QR code.

Additionally, or alternatively, the process 600 may include determining that the user device is disconnected from the server when the transaction is initiated. The process 600 may also include querying the other user device for an indication that the other user device is connected to the server. In these examples, exchanging the first embedding and the second embedding may be based at least in part on the user device being disconnected from the server and receiving response data from the other user device indicating that the other user device is disconnected from the server.

Additionally, or alternatively, the process 600 may include causing the second embedding to be input into the machine learning model. The process 600 may also include generating, utilizing the machine learning model, a risk metric indicating a likelihood that the funds for the transaction will be received from the second user account. The process 600 may also include displaying the risk metric on the user device in association with functionality for selecting whether to effectuate the transaction.

Additionally, or alternatively, the process 600 may include receiving first data documenting the transaction from the other user device, the first data digitally signed by the other user device. The process 600 may also include digitally signing the first data documenting the transaction on the user device in response to receiving user input data requesting to effectuate the transaction following the analyzing. The process 600 may also include sending an instance of the first data digitally signed by the user device to the other user device to the server in response to the user device being online with the server.

Additionally, or alternatively, the process 600 may include determining that a connection to the server has been reestablished after effectuating the transaction on the user device. The process 600 may also include, based at least in part on the connection to the server being reestablished, sending, to the server, first data documenting the transaction as digitally signed by the user device and the other device.

FIG. 7 is a flow diagram of an example process 700 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 700.

At block 702, the process 700 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 134, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 704, the process 700 may include collecting transaction data over a period of time. The transaction data may include any of the data described with respect to the datastore(s) 134, any data associated with offline transactions and particularly those where on-device machine learning models are utilized to determine risk metrics from embeddings as described herein, any data described with respect to FIGS. 1-5, or any other data that may be utilized to perform the operations described herein. This information may include, for example, a cause of the user devices being offline, the user accounts associated with the offline transactions, the embeddings involved in the offline transactions, the risk metrics that were determined, an indication of whether the transaction was effectuated, etc.

At block 706, the process 700 may include generating a training dataset from the transaction data. Generation of the training dataset may include formatting the transaction data into input vectors for the machine learning model to intake, as well as associating the various data with the outcomes of the transactions described herein.

At block 708, the process 700 may include generating one or more trained machine learning models utilizing the training dataset. Generation of the trained machine learning models may include updating parameters and/or weightings and/or thresholds utilized by the models to generate risk metrics based at least in part on the data from the training dataset.

For example, a machine learning model may be generated and configured to determine risk metrics associated with a transaction utilizing user account characteristics embeddings and transaction embeddings as described herein. To train the model, a training dataset indicating characteristics of the offline transaction and the generated risk metrics, including feedback data indicating how transactions proceeded after the risk metrics were displayed as well as whether those risk metrics accurately identified risky transactions. This data may serve to adjust weights and threshold that the model utilizes for these and other data types to determine how certain data impacts how risk metrics are determined or scaled. The output of these trained machine learning models may be a more accurate and may more readily identify risky transactions that should not proceed in an offline user device user case.

At block 710, the process 700 may include determining whether the trained machine learning models indicate improved performance metrics. For example, a testing group may be generated where the outcomes of the transactions are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 700 may include, at block 712, utilizing the trained machine learning models for generating subsequent results. For example, the trained machine learning models may be utilized to generate the embeddings that are sent to the user devices to be exchanged between those user devices when offline from the payment service, as well as for generating risk metrics as described herein. It should be understood that the trained machine learning models may be utilized in any scenario where models are utilized as described herein.

In examples where the trained machine learning models do not indicate improved performance metrics, the process 700 may include, at block 714, utilizing the previous iteration of the machine learning models for generating subsequent results.

Figure 8:
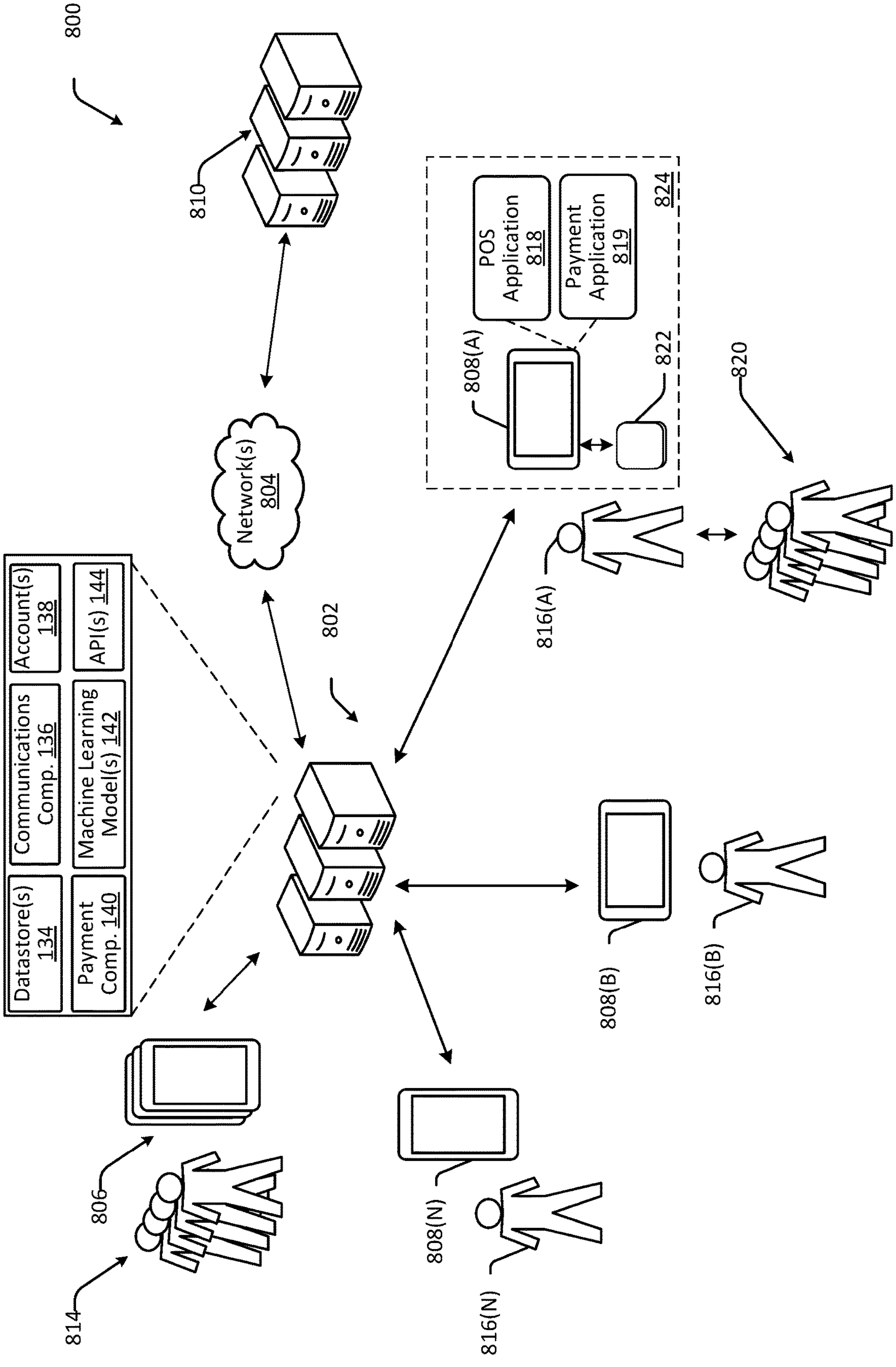
FIG. 8 is an example environment with user devices, merchant devices, a payment service, and/or other systems that may be involved in a transaction, such as by utilizing the payment application as configured herein, according to an embodiment described herein.

FIG. 8 is an example environment with user devices, merchant devices, a payment service, and/or other systems that may be involved in a transaction, such as by utilizing the payment application as configured herein, according to an embodiment described herein. The environment 800 includes server(s) 802 that can communicate over a network 804 with user devices 806 (which, in some examples can be merchant devices 808 (individually, 808(A)-808 (N))) and/or server(s) 810 associated with third-party service provider(s). The server(s) 802 can be associated with a service provider that can provide one or more services for the benefit of users 814, as described below. Actions attributed to the service provider can be performed by the server(s) 802.

In examples, the server(s) 802 may be the same as or similar to the payment service 104 from FIG. 1, which may include the same or similar components as described with respect to the payment service 104 of FIG. 1, including the components of the CRM 132 as shown in FIG. 8. Further, the user devices 102 from FIG. 1 may have the same or similar components and perform the same or similar functionality as the user devices 806 from FIG. 8.

The environment 800 can include a plurality of user devices 806, as described above. The user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

As described above, in at least one example, the users 814 can include merchants 816 (individually, 816(A)-816(N)). In an example, the merchants 816 can operate respective merchant devices 808, which can be user devices 806 configured for use by merchants 816. For the purpose of this discussion, a "merchant" can be any entity that offers items (e.g., goods or services) for purchase or other means of acquisition (e.g., rent, borrow, barter, etc.). The merchants 816 can offer items for purchase or other means of acquisition via brick-and-mortar stores, mobile stores (e.g., pop-up shops, food trucks, etc.), online stores, combinations of the foregoing, and so forth. In some examples, at least some of the merchants 816 can be associated with a same entity but can have different merchant locations and/or can have franchise/franchisee relationships. In additional or alternative examples, the merchants 816 can be different merchants. That is, in at least one example, the merchant 816(A) is a different merchant than the merchant 816(B) and/or the merchant 816(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Merchant devices 808 can have an instance of a POS application 818 stored thereon. The POS application 818 can configure the merchant device 808 as a POS terminal, which enables the merchant 816(A) to interact with one or more customers 820. As described above, the users 814 can include customers, such as the customers 820 shown as interacting with the merchant 816(A). For the purpose of this discussion, a "customer" can be any entity that acquires items from merchants. While only two customers 820 are illustrated in FIG. 8, any number of customers 820 can interact with the merchants 816. Further, while FIG. 8 illustrates the customers 820 interacting with the merchant 816(A), the customers 820 can interact with any of the merchants 816.

In at least one example, interactions between the customers 820 and the merchants 816 that involve the exchange of funds (from the customers 820) for items (from the merchants 816) can be referred to as "transactions." In at least one example, the POS application 818 can determine transaction data associated with the POS transactions. Transaction data can include payment information, which can be obtained from a reader device 822 associated with the merchant device 808(A), user authentication data, purchase amount information, point-of-purchase information (e.g., item(s) purchased, date of purchase, time of purchase, etc.), etc. The POS application 818 can send transaction data to the server(s) 802 such that the server(s) 802 can track transactions of the customers 820, merchants 816, and/or any of the users 814 over time. Furthermore, the POS application 818 can present a UI to enable the merchant 816(A) to interact with the POS application 818 and/or the service provider via the POS application 818.

In at least one example, the merchant device 808(A) can be a special-purpose computing device configured as a POS terminal (via the execution of the POS application 818). In at least one example, the POS terminal may be connected to a reader device 822, which is capable of accepting a variety of payment instruments, such as credit cards, debit cards, gift cards, short-range communication based payment instruments, and the like, as described below. In at least one example, the reader device 822 can plug in to a port in the merchant device 808(A), such as a microphone port, a headphone port, an audio-jack, a data port, or other suitable port. In additional or alternative examples, the reader device 822 can be coupled to the merchant device 808(A) via another wired or wireless connection, such as via a Bluetooth®, BLE, and so on. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 822, and communicate with the server(s) 802, which can provide, among other services, a payment processing service. The server(s) 802 associated with the service provider can communicate with server(s) 810, as described below. In this manner, the POS terminal and reader device 822 may collectively process transaction(s) between the merchants 816 and customers 820. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to the customers 820. In additional or alternative examples, the POS terminal can have a display integrated therein for presenting information to the customers 820. POS systems, such as the POS system 824, may be mobile, such that POS terminals and reader devices may process transactions in disparate locations across the world. POS systems can be used for processing card-present transactions and card-not-present (CNP) transactions, as described below.

A card-present transaction is a transaction where both a customer 820 and his or her payment instrument are physically present at the time of the transaction. Card-present transactions may be processed by swipes, dips, taps, or any other interaction between a physical payment instrument (e.g., a card), or otherwise present payment instrument, and a reader device 822 whereby the reader device 822 is able to obtain payment data from the payment instrument. A swipe is a card-present transaction where a customer 820 slides a card, or other payment instrument, having a magnetic strip through a reader device 822 that captures payment data contained in the magnetic strip. A dip is a card-present transaction where a customer 820 inserts a payment instrument having an embedded microchip (i.e., chip) into a reader device 822 first. The dipped payment instrument remains in the payment reader until the reader device 822 prompts the customer 820 to remove the card, or other payment instrument. While the payment instrument is in the reader device 822, the microchip can create a one-time code which is sent from the POS system 824 to the server(s) 810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 820 may tap or hover his or her payment instrument (e.g., card, electronic device such as a smart phone running a payment application, etc.) over a reader device 822 to complete a transaction via short-range communication (e.g., NFC, RFID, Bluetooth®, BLE, etc.). Short-range communication enables the payment instrument to exchange information with the reader device 822. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 824, the server(s) 802, and/or the server(s) 810 may exchange payment information and transaction data to determine whether transactions are authorized. For example, the POS system 824 may provide encrypted payment data, user authentication data, purchase amount information, point-of-purchase information, etc. (collectively, transaction data) to server(s) 802 over the network(s) 804. The server(s) 802 may send the transaction data to the server(s) 810. As described above, in at least one example, the server(s) 810 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 810 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 810 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 810 associated therewith), and a payment authorization message is communicated from the issuer to the POS device via a path opposite of that described above, or via an alternate path.

As described above, the server(s) 810, which can be associated with payment service provider(s), may determine whether the transaction is authorized based on the transaction data, as well as information relating to parties to the transaction (e.g., the customer 820 and/or the merchant 816(A)). The server(s) 810 may send an authorization notification over the network(s) 804 to the server(s) 802, which may send the authorization notification to the POS system 824 over the network(s) 804 to indicate whether the transaction is authorized. The server(s) 802 may also transmit additional information such as transaction identifiers to the POS system 824. In one example, the server(s) 802 may include a merchant application and/or other functional components for communicating with the POS system 824 and/or the server(s) 810 to authorize or decline transactions.

Based on the authentication notification that is received by the POS system 824 from server(s) 802, the merchant 816(A) may indicate to the customer 820 whether the transaction has been approved. In some examples, approval may be indicated at the POS system 824, for example, at a display of the POS system 824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 814 can access the services of the service provider. In other examples, the users 814 can have graduated access to the services, which can be based on risk tolerance, IDV outputs, subscriptions, and so on. In at least one example, access to such services can be availed to the merchants 816 via the POS application 818. In additional or alternative examples, each service can be associated with its own access point (e.g., application, web browser, etc.).

The service provider can offer payment processing services for processing payments on behalf of the merchants 816, as described above. For example, the service provider can provision payment processing software, payment processing hardware and/or payment processing services to merchants 816, as described above, to enable the merchants 816 to receive payments from the customers 820 when conducting POS transactions with the customers 820. For instance, the service provider can enable the merchants 816 to receive cash payments, payment card payments, and/or electronic payments from customers 820 for POS transactions and the service provider can process transactions on behalf of the merchants 816.

As the service provider processes transactions on behalf of the merchants 816, the service provider can maintain accounts or balances for the merchants 816 in one or more ledgers. For example, the service provider can analyze transaction data received for a transaction to determine an amount of funds owed to a merchant 816(A) for the transaction. In at least one example, such an amount can be a total purchase price less fees charged by the service provider for providing the payment processing services. Based on determining the amount of funds owed to the merchant 816(A), the service provider can deposit funds into an account of the merchant 816(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 816(A) to a bank account of the merchant 816(A) that is held at a bank or other financial institution (e.g., associated with the server(s) 810). Scheduled deposits can occur at a prearranged time after a POS transaction is funded, which can be a business day after the POS transaction occurred, or sooner or later. In some examples, the merchant 816(A) can access funds prior to a scheduled deposit. For instance, the merchant 816(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 816(A) can have a payment instrument that is linked to the stored balance that enables the merchant to access the funds without first transferring the funds from the account managed by the service provider to the bank account of the merchant 816(A).

In at least one example, the service provider may provide inventory management services. That is, the service provider may provide inventory tracking and reporting. Inventory management services may enable the merchant 816(A) to access and manage a database storing data associated with a quantity of each item that the merchant 816(A) has available (i.e., an inventory). Furthermore, in at least one example, the service provider can provide catalog management services to enable the merchant 816(A) to maintain a catalog, which can be a database storing data associated with items that the merchant 816(A) has available for acquisition (i.e., catalog management services). In at least one example, the catalog may include a plurality of data items and a data item of the plurality of data items may represent an item that the merchant 816(A) has available for acquisition. The service provider can offer recommendations related to pricing of the items, placement of items on the catalog, and multi-party fulfilment of the inventory.

In at least one example, the service provider can provide business banking services, which allow the merchant 816(A) to track deposits (from payment processing and/or other sources of funds) into an account of the merchant 816(A), payroll payments from the account (e.g., payments to employees of the merchant 816(A)), payments to other merchants (e.g., business-to-business) directly from the account or from a linked debit card, withdrawals made via scheduled deposit and/or instant deposit, etc. Furthermore, the business banking services can enable the merchant 816(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 816 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 816. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 812 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 814 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 816. In at least one example, the service provider can recommend and/or generate content items to supplement omni-channel presences of the merchants 816. That is, if a merchant of the merchants 816 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 814 to set schedules for scheduling appointments and/or users 814 to schedule appointments.

In some examples, the service provider can provide restaurant management services to enable users 814 to make and/or manage reservations, to monitor front-of-house and/or back-of-house operations, and so on. In such examples, the merchant device(s) 808 and/or server(s) 802 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 814 who can travel between locations to perform services for a requesting user 814 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 806.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 814, voice inputs into a virtual assistant or the like, to determine intents of user(s) 814. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 814 may be new to the service provider such that the user 814 that has not registered (e.g., subscribed to receive access to one or more services offered by the service provider) with the service provider. The service provider can offer onboarding services for registering a potential user 814 with the service provider. In some examples, onboarding can involve presenting various questions, prompts, and the like to a potential user 814 to obtain information that can be used to generate a profile for the potential user 814. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 814 providing all necessary information, the potential user 814 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 810). That is, the service provider can offer IDV services to verify the identity of users 814 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 814 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 810 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 802) and/or the server(s) 810 via the network(s) 804. In some examples, the merchant device(s) 808 are not capable of connecting with the service provider (e.g., the server(s) 802) and/or the server(s) 810, due to a network connectivity issue, for example. In additional or alternative examples, the server(s) 802 are not capable of communicating with the server(s) 810 due to network connectivity issue, for example. In such examples, devices may operate in "offline" mode where at least some payment data is stored (e.g., on the merchant device(s) 808) and/or the server(s) 802 until connectivity is restored and the payment data can be transmitted to the server(s) 802 and/or the server(s) 810 for processing.

In at least one example, the service provider can be associated with a hub, such as an order hub, an inventory hub, a fulfillment hub and so on, which can enable integration with one or more additional service providers (e.g., associated with the additional server(s) 810). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 806 that are in communication with one or more server computing devices 802 of the service provider. That is, techniques described herein are directed to a specific implementation—or, a practical application—of utilizing a distributed system of user devices 806 that are in communication with one or more server computing devices 802 of the service provider to perform a variety of services, as described above. The unconventional configuration of the distributed system described herein enables the server(s) 802 that are remotely-located from end-users (e.g., users 814) to intelligently offer services based on aggregated data associated with the end-users, such as the users 814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 814 and user devices 806. Furthermore, such features are changed dynamically based on the profiles of the users involved interacting with the GUIs. As such, techniques described herein are directed to improvements to computing systems.

Figure 9:
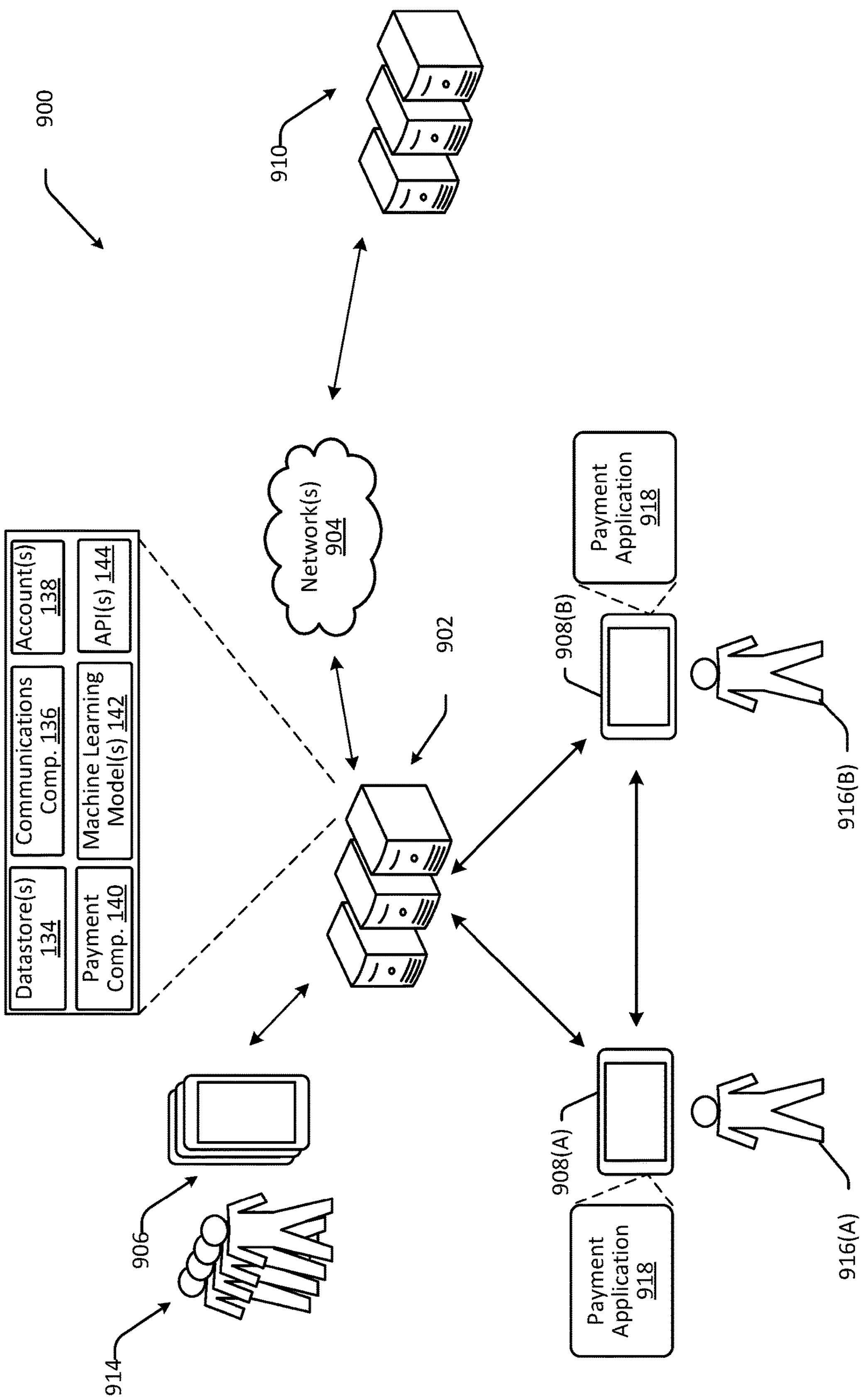
FIG. 9 is an example environment illustrating usage of the payment application, such as described herein, according to an embodiment described herein.

FIG. 9 is an example environment illustrating usage of the payment application, according to an embodiment described herein. The environment 900 includes server(s) 902 that can communicate over a network 904 with user devices 906 (which, in some examples can be user devices 908 (individually, 908(A), 908(B)) and/or server(s) 910 associated with third-party service provider(s). The server(s) 902 can be associated with a service provider that can provide one or more services for the benefit of users 914, as described below. Actions attributed to the service provider can be performed by the server(s) 902. In some examples, the service provider referenced in FIG. 8 can be the same or different than the service provider referenced in FIG. 9.

As described herein, the server(s) 902 may be the same or similar to the payment service 104 described with respect to FIG. 1, which may include the same or similar components as described with respect to the payment service 104 of FIG. 1, including the components of the CRM 132, as shown in FIG. 9. The user devices 906, 908 may be the same or similar to the user device 102 described with respect to FIG. 1. The server(s) 910 associated with third-party service provider(s) may be the same as or similar to the systems associated with payment services or the like, as described herein.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

In at least one example, the service provider can provide a peer-to-peer payment service that enables peer-to-peer payments between two or more users 914. Two users, user 916(A) and user 916(B) are illustrated in FIG. 9 as "peers" in a peer-to-peer payment. In at least one example, the service provider can communicate with instances of a payment application 918 (or other access point) installed on devices 906 configured for operation by users 914. In an example, an instance of the payment application 918 executing on a first device 908(A) operated by a payor (e.g., user 916(A)) can send a request to the service provider to transfer an asset (e.g., fiat currency, non-fiat currency, cryptocurrency, securities, gift cards, and/or related assets) from the payor to a payee (e.g., user 916(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 10:
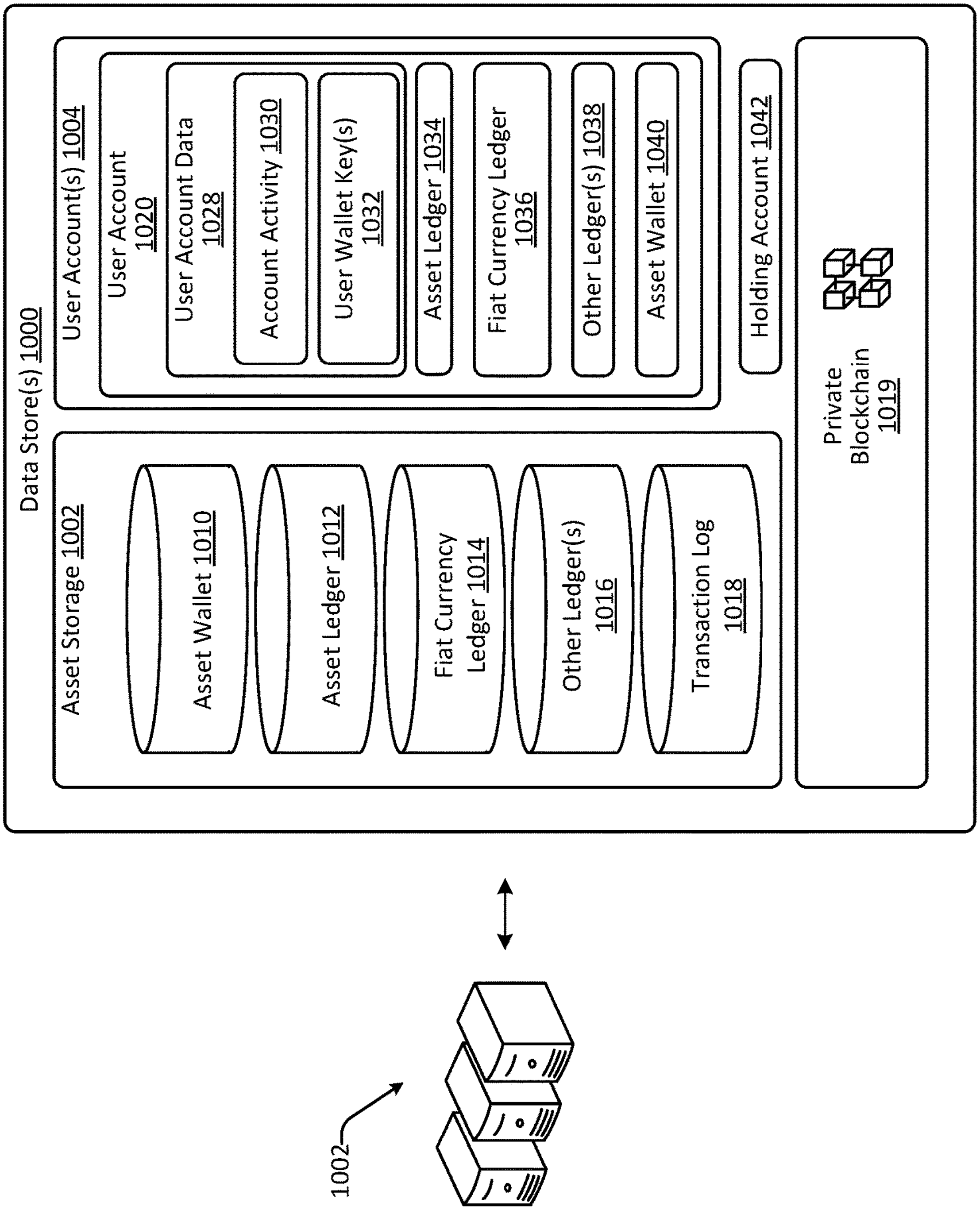
FIG. 10 is an example of datastore(s) that can be associated with servers of the payment service, according to an embodiment described herein.

In some examples, the service provider can utilize a ledger system to track transfers of assets between users 906. FIG. 10, below, provides additional details associated with such a ledger system. The ledger system can enable users 906 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 918 executing on user device(s) of payee(s). As an example, the service provider can transfer assets from an account of user 916(A) to an account of the user 916(B) and can send a notification to the user device 908(B) of the user 916(B) for presentation via a user interface. The notification can indicate that a transfer is in process, a transfer is complete, or the like. In some examples, the service provider can send additional or alternative information to the instances of the payment application 918 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 902 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 918 executing on the user devices 906. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 9. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 906 (e.g., mobile device or conventional personal computer (PC)) based on instructions transmitted to and from the server(s) 902 (which, in such an example can be called a "messaging server"). In some instances, the messaging application can include a payment application with messaging capability that enables users of the payment application to communicate with one another. In such instances, the payment application can be executed on a user device 906 based on instructions transmitted to and from the server(s) 902 (e.g., the payment service discussed in this description or another payment service that supports payment transactions). In some examples, the messaging application can be provided by a third-party service provider associated with the server(s) 910. In examples where the messaging application is a third-party service provider, the server(s) 910 can be accessible via one or more APIs or other integrations.

As described above, the service provider can facilitate peer-to-peer transactions, which can enable users 906 to transfer fiat currency, non-fiat currency, cryptocurrency, securities, or other assets, or portions thereof, to other users 906. In at least one example, individual users can be associated with user accounts. Additional details associated with user accounts and the transfer of assets between users 906 are described below with reference to FIG. 10.

Furthermore, the service provider of FIG. 9 can enable users 906 to perform banking transactions via instances of the payment application 918. For example, users can configure direct deposits or other deposits for adding assets to their various ledgers/balances. Further, users 906 can configure bill pay, recurring payments, and/or the like using assets associated with their accounts. In addition to sending and/or receiving assets via peer-to-peer transactions, users 906 buy and/or sell assets via asset networks such as cryptocurrency networks, securities networks, and/or the like.

FIG. 10 is an example of data store(s) that can be associated with servers of the payment service, according to an embodiment described herein. In at least one example, the data store(s) 1000 can store assets in an asset storage 1002, as well as data in user account(s) 1004, merchant account(s) 1006, and/or customer account(s) 1008. In at least one example, the asset storage 1002 can be used to store assets managed by the service provider of FIG. 9. In at least one example, the asset storage 1002 can be used to record whether individual of the assets are registered to users. For example, the asset storage 1002 can include an asset wallet 1010 for storing records of assets owned by the service provider of FIG. 9, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 910 can be associated therewith. In some examples, the asset wallet 1010 can communication with the asset network via one or more components associated with the server(s) 902.

The asset wallet 1010 can be associated with one or more addresses and can vary addresses used to acquire assets (e.g., from the asset network(s)) so that its holdings are represented under a variety of addresses on the asset network. In examples where the service provider of FIG. 9 has its own holdings of cryptocurrency (e.g., in the asset wallet 1010), a user can acquire cryptocurrency directly from the service provider of FIG. 9. In some examples, the service provider of FIG. 9 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1002 may contain ledgers that store records of assignments of assets to users 906. Specifically, the asset storage 1002 may include asset ledger 1010, fiat currency ledger 1014, and other ledger(s) 1016, which can be used to record transfers of assets between users 906 of the service provider and/or one or more third-parties (e.g., merchant network(s), payment card network(s), ACH network(s), equities network(s), the asset network, securities networks, etc.). In doing so, the asset storage 1002 can maintain a running balance of assets managed by the service provider of FIG. 9. The ledger(s) of the asset storage 1002 can further indicate some of the running balance for each of the ledger(s) stored in the asset storage 1002 is assigned or registered to one or more user account(s) 1004.

In at least one example, the asset storage 1002 can include transaction logs 1018, which can include records of past transactions involving the service provider of FIG. 9. In at least one example, transaction data, as described herein, can be stored in association with the transaction logs 1018.

In some examples, the data store(s) 1000 can store a private blockchain 1019. A private blockchain 1019 can function to record sender addresses, recipient addresses, public keys, values of cryptocurrency transferred, and/or can be used to verify ownership of cryptocurrency tokens to be transferred. In some examples, the service provider of FIG. 9 can record transactions taking place within the service provider of FIG. 9 involving cryptocurrency until the number of transactions has exceeded a determined limit (e.g., number of transactions, storage space allocation, etc.). Based at least in part on determining that the limit has been reached, the service provider of FIG. 9 can publish the transactions in the private blockchain 1019 to a public blockchain (e.g., associated with the asset network), where miners can verify the transactions and record the transactions to blocks on the public blockchain. In at least one example, the service provider of FIG. 9 can participate as miner(s) at least for its transactions to be posted to the public blockchain.

In at least one example, the data store(s) 1000 can store and/or manage accounts, such as user account(s) 1004, merchant account(s) 1006, and/or customer account(s) 1008. In at least one example, the user account(s) 1004 may store records of user accounts associated with the users 906. In at least one example, the user account(s) 1004 can include a user account 1020, which can be associated with a user (of the users 906). Other user accounts of the user account(s) 1004 can be similarly structured to the user account 1020, according to some examples. In other examples, other user accounts may include more or less data and/or account information than that provided by the user account 1020. In at least one example, the user account 1020 can include user account data 1028, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1028 can include account activity 1030 and user wallet key(s) 1032. The account activity 1030 may include a transaction log for recording transactions associated with the user account 1020. In some examples, the user wallet key(s) 1032 can include a public-private key-pair and a respective address associated with the asset network or other asset networks. In some examples, the user wallet key(s) 1032 may include one or more key pairs, which can be unique to the asset network or other asset networks.

In addition to the user account data 1028, the user account 1020 can include ledger(s) for account(s) managed by the service provider of FIG. 9, for the user. For example, the user account 1020 may include an asset ledger 1034, a fiat currency ledger 1036, and/or one or more other ledgers 1038. The ledger(s) can indicate that a corresponding user utilizes the service provider of FIG. 9 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 9.

In some examples, the asset ledger 1034 can store a balance for each of one or more cryptocurrencies (e.g., Bitcoin, Ethereum, Litecoin, etc.) registered to the user account 1020. In at least one example, the asset ledger 1034 can further record transactions of cryptocurrency assets associated with the user account 1020. For example, the user account 1020 can receive cryptocurrency from the asset network using the user wallet key(s) 1032. In some examples, the user wallet key(s) 1032 may be generated for the user upon request. User wallet key(s) 1032 can be requested by the user in order to send, exchange, or otherwise control the balance of cryptocurrency held by the service provider of FIG. 9 (e.g., in the asset wallet 1010) and registered to the user. In some examples, the user wallet key(s) 1032 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 9 and the value is credited as a balance in asset ledger 1034), by purchasing currency in the form associated with the account using currency in a different form (e.g., buying a value of cryptocurrency from the service provider of FIG. 9 using a value of fiat currency reflected in fiat currency ledger 1014, and crediting the value of cryptocurrency in asset ledger 1034), or by conducting a transaction with another user (customer or merchant) of the service provider of FIG. 9 wherein the account receives incoming currency (which can be in the form associated with the account or a different form, in which the incoming currency may be converted to the form associated with the account). In some examples, the user account data 1028 can include preferences for maintaining balances of individual of the ledgers. For example, the service provider of FIG. 9 can automatically debit the fiat currency ledger 1036 to increase the asset ledger 1034, or another account associated with the user whenever the cryptocurrency balance (e.g., of the asset ledger 1034) falls below a stated level (e.g., a threshold). Conversely, in some embodiments, the service provider of FIG. 9 can automatically credit the fiat currency ledger 1036 to decrease the asset ledger 1034 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 9 (i.e., an external account). In at least one example, the user can transfer all or a portion of a balance of the cryptocurrency stored in the third-party cryptocurrency wallet to the service provider of FIG. 9. Such a transaction can require the user to transfer an amount of the cryptocurrency in a message signed by user's private key to an address provided by the service provider of FIG. 9. In at least one example, the transaction can be sent to miners to bundle the transaction into a block of transactions and to verify the authenticity of the transactions in the block. Once a miner has verified the block, the block is written to a public, distributed blockchain where the service provider of FIG. 9 can then verify that the transaction has been confirmed and can credit the user's asset ledger 1034 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 9. As described above, in some examples, the service provider of FIG. 9 can acquire cryptocurrency from a third-party source. In such examples, the asset wallet 1010 can be associated with different addresses and can vary addresses used to acquire cryptocurrency so that its holdings are represented under a variety of addresses on a blockchain. When the service provider of FIG. 9 has their own holdings of cryptocurrency, users can acquire cryptocurrency directly from the service provider of FIG. 9. In some examples, the service provider of FIG. 9 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 9 has its own cryptocurrency assets, cryptocurrency transferred in a transaction (e.g., data with address provided for receipt of transaction and a balance of cryptocurrency transferred in the transaction) can be stored in the asset wallet 1010. In at least one example, the service provider of FIG. 9 can credit the asset ledger 1034 of the user. Additionally, while the service provider of FIG. 9 recognizes that the user retains the value of the transferred cryptocurrency through crediting the asset ledger 1034, any person that inspects the blockchain will see the cryptocurrency as having been transferred to the service provider of FIG. 9. In some examples, the asset wallet 1010 can be associated with many different addresses. In such examples, any person that inspects the blockchain may not easily associate all cryptocurrency stored in asset wallet 1010 as belonging to the same entity. It is this presence of a private ledger that is used for real-time transactions and maintained by the service provider of FIG. 9, combined with updates to the public ledger at other times, that allows for extremely fast transactions using cryptocurrency to be achieved. In some examples, the "private ledger" can refer to the asset ledger 1010, which in some examples, can utilize the private blockchain 1019, as described herein. The "public ledger" can correspond to a public blockchain associated with the asset network.

In at least one example, a user's asset ledger 1034, fiat currency ledger 1036, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1034. In some examples, a user can receive fiat currency or another currency in the form of payment for a transaction with another user. In at least one example, at least a portion of such funds can be converted into cryptocurrency by the service provider of FIG. 9 and used to fund the asset ledger 1034 of the user.

As addressed above, in some examples, users can also have other accounts maintained by the service provider of FIG. 9. For example, a user can also have an account in U.S. dollars, which can be tracked, for example, via the fiat currency ledger 1036. Such an account can be funded by transferring money from a bank account at a third-party bank to an account maintained by the service provider of FIG. 9 as is conventionally known. In some examples, a user can receive fiat currency in the form of payment for a transaction with another user. In such examples, at least a portion of such funds can be used to fund the fiat currency ledger 1036.

In some examples, a user can have one or more internal payment cards registered with the service provider of FIG. 9. Internal payment cards can be linked to one or more of the accounts associated with the user account 1020. In some embodiments, options with respect to internal payment cards can be adjusted and managed using an application (e.g., the payment application 918).

In at least one example, as described above, each ledger can correspond to an account of the user that is managed by the service provider of FIG. 9. In at least one example, individual of the accounts can be associated with a wallet or a stored balance for use in payment transactions, peer-to-peer transactions, payroll payments, etc.

In at least one example, the user account 1020 can be associated with an asset wallet 1040. The asset wallet 1040 of the user can be associated with account information that can be stored in the user account data 1028 and, in some examples, can be associated with the user wallet key(s) 1032. In at least one example, the asset wallet 1040 can store data indicating an address provided for receipt of a cryptocurrency transaction. In at least one example, the balance of the asset wallet 1040 can be based at least in part on a balance of the asset ledger 1034. In at least one example, funds availed via the asset wallet 1040 can be stored in the asset wallet 1040 or the asset wallet 1010. Funds availed via the asset wallet 1010 can be tracked via the asset ledger 1034. The asset wallet 1040, however, can be associated with additional cryptocurrency funds.

In at least one example, when the service provider of FIG. 9 includes a private blockchain 1019 for recording and validating cryptocurrency transactions, the asset wallet 1040 can be used instead of, or in addition to, the asset ledger 1034. For example, at least one example, a merchant can provide the address of the asset wallet 1040 for receiving payments. In an example where a customer is paying in cryptocurrency and the customer has their own cryptocurrency wallet account associated with the service provider of FIG. 9, the customer can send a message signed by its private key including its wallet address (i.e., of the customer) and identifying the cryptocurrency and value to be transferred to the merchant's asset wallet 1040. The service provider of FIG. 9 can complete the transaction by reducing the cryptocurrency balance in the customer's cryptocurrency wallet and increasing the cryptocurrency balance in the merchant's asset wallet 1040. In addition to recording the transaction in the respective cryptocurrency wallets, the transaction can be recorded in the private blockchain 1019 and the transaction can be confirmed. A user can perform a similar transaction with cryptocurrency in a peer-to-peer transaction as described above. In at least one example, the cryptocurrency wallet account 1030 can be funded by a balance transfer from a third-party cryptocurrency wallet, as described above. Such a transaction can require a user to transfer an amount of cryptocurrency in a message signed by the user's private key to an address of the cryptocurrency wallet account 1030. The transferred amount of cryptocurrency can then be within the cryptocurrency wallet account 1030 for use in later transactions.

While the asset ledger 1034 and/or asset wallet 1040 are each described above with reference to cryptocurrency, the asset ledger 1034 and/or asset wallet 1040 can alternatively be used in association with securities. In some examples, different ledgers and/or wallets can be used for different types of assets. That is, in some examples, a user can have multiple asset ledgers and/or asset wallets for tracking cryptocurrency, securities, or the like.

The data stores 1000 may also include a holding account 1042, which may be similar to and perform similar functions as the holding account 146 described with respect to FIG. 1.

It should be noted that user(s) having accounts managed by the service provider of FIG. 9 is an aspect of the technology disclosed that enables technical advantages of increased processing speed and improved security.

Figure 11:
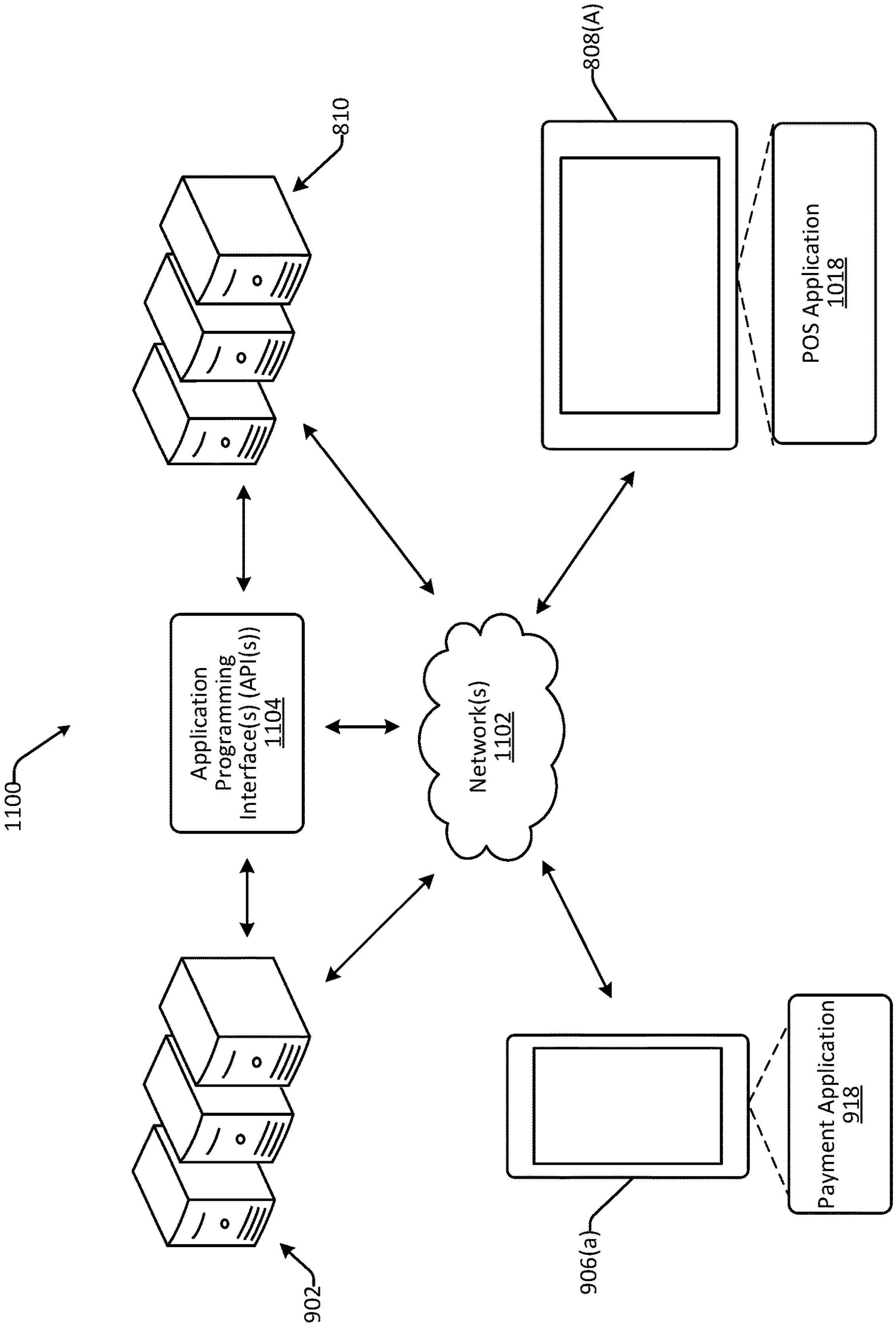
FIG. 11 is an example environment wherein the payment service environment of FIG. 8 and the environment from FIG. 9 can be integrated to enable payments at the point-of-sale using assets associated with user accounts in the peer-to-peer environment of FIG. 9, according to an embodiment described herein.

FIG. 11 is an example environment 1100 wherein the environment 1000 and the environment 1100 can be integrated to enable payments at the point-of-sale using assets associated with user accounts in the peer-to-peer environment of FIG. 11, according to an embodiment described herein. As illustrated, each of the components can communicate with one another via one or more networks 1102. In some examples, one or more APIs 1104 or other functional components can be used to facilitate such communication. For example, the APIs 1104 can be used to facilitate communication with payment service server(s) 1102 and server(s) 1110 associated with third-party service provider(s).

In at least one example, the example environment 1100 can enable contactless payments, via integration of peer-to-peer payment, or other payment making, platform(s) and payment processing platform(s), are described herein. For the purpose of FIG. 11, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other—and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user interface presented via the payment application). As an item is added to a virtual cart by the merchant—via the POS application 1018 on the merchant device 1008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 12:
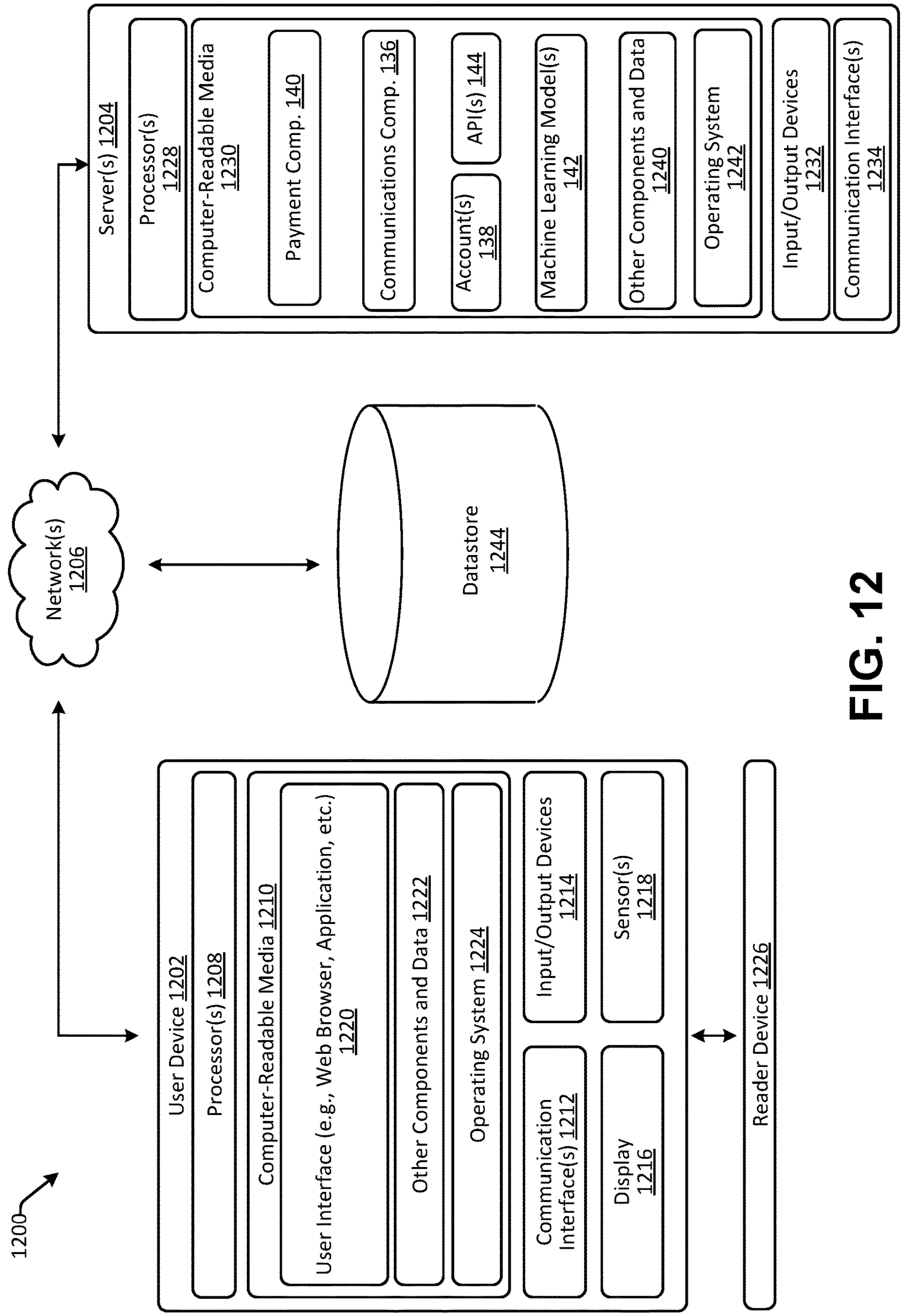
FIG. 12 is an illustrative block diagram illustrating a system for performing techniques described herein, according to an embodiment described herein.

FIG. 12 is an illustrative block diagram illustrating a system for performing techniques described herein, according to an embodiment described herein. The system 1200 includes a user device 1202, that communicates with server computing device(s) (e.g., server(s) 1204) via network(s) 1206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1200 can have multiple user devices, as described above with reference to FIG. 12.

The user device 1202 may be the same or similar to the user device 102 as described with respect to FIG. 1. Additionally, the server(s) 1204 may be the same or similar to the payment service 104 described with respect to FIG. 1.

In at least one example, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1202 can be any computing device capable of sending communications and performing the functions according to the techniques described herein. The user device 1202 can include devices, e.g., payment card readers, or components capable of accepting payments, as described below.

In the illustrated example, the user device 1202 includes one or more processors 1208, one or more computer-readable media 1210, one or more communication interface(s) 1212, one or more input/output (I/O) devices 1214, a display 1216, and sensor(s) 1218.

In at least one example, each processor 1208 can itself comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In at least one example, the user interface 1220 can be presented via a web browser, or the like. In other examples, the user interface 1220 can be presented via an application, such as a mobile application or desktop application, which can be provided by a service provider associated with the server(s) 1204, or which can be an otherwise dedicated application. In some examples, the user interface 1220 can be configured to display options for withdrawing funds to make donations. The user interface 1220 may also be configured to surface information about donations. It should be understood that the user interface 1220 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In at least one example, the computer-readable media 1210 can include additional functional components, such as an operating system 1224 for controlling and managing various functions of the user device 1202 and for enabling basic user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C, Bluetooth, etc.) to connect with the user device 1202.

In at least one example, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In at least one example, the display 1216 can be an augmented reality display, a virtually reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. Alternatively, in some examples, the user device 1202 may not include the display 1216, and information can be presented by other means, such as aurally, haptically, etc.

In addition, the user device 1202 can include sensor(s) 1218. The sensor(s) 1218 can include a GPS device able to indicate location information. Further, the sensor(s) 1218 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1224, described above, to provide one or more services. That is, in some examples, the service provider 1224 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1214 and/or for sending users 1214 notifications regarding available appointments with merchant(s) located proximate to the users 1214. In at least one example, location can be used for taking payments from nearby customers when they leave a geofence, or location can be used to initiate an action responsive to users 1214 enter a brick-and-mortar store of a merchant. Location can be used in additional or alternative ways as well.

Additionally, the user device 1202 can include various other components that are not shown, examples of which include removable storage, a power source, such as a battery and power control unit, a barcode scanner, a printer, a cash drawer, and so forth.

In addition, in some examples, the user device 1202 can include, be connectable to, or otherwise be coupled to a reader device 1226, for reading payment instruments and/or identifiers associated with payment objects. In some examples, as described above, the reader device 1226 can plug in to a port in the user device 1202, such as a microphone port, a headphone port, an audio-jack, a data port, or other suitable port. In additional or alternative examples, the reader device 1226 can be coupled to the user device 1202 via another wired or wireless connection, such as via a Bluetooth®, BLE, and so on. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1226 may also include a biometric sensor to receive and process biometric characteristics and process them as payment instruments, given that such biometric characteristics are registered with the payment service 104 and connected to a financial account with a bank server.

The reader device 1226 may include processing unit(s), computer-readable media, a reader chip, a transaction chip, a timer, a clock, a network interface, a power supply, and so on. The processing unit(s) of the reader device 1226 may execute one or more components and/or processes to cause the reader device 1226 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1226, the computer-readable media may include volatile memory (such as RAM), non-volatile memory (such as ROM, flash memory, miniature hard drive, memory card, or the like), or some combination thereof. In at least one example, the computer-readable media of the reader device 1226 may include at least one component for performing various functions as described herein.

The reader chip may perform functionalities to control the operations and processing of the reader device 1226. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1212, which may provide a clock signal indicating a time. Furthermore, the reader chip may perform functionality to control the network interface, which may interface with the network(s) 1206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1202, which can be a POS terminal, and the reader device 1226 are shown as separate devices, in additional or alternative examples, the user device 1202 and the reader device 1226 can be part of a single device, which may be a battery-operated device. In such an example, components of both the user device 1202 and the reader device 1226 may be associated with the single device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the service provider and/or payment processing service. Functional components stored in the computer-readable media 1230 can optionally include the components described with respect to the CRM 132 from FIG. 1, as shown in FIG. 12.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1202 and/or the server(s) 1204 for use at a time after the data models have been trained (e.g., at runtime).

The one or more other components and data 1240 can include programs, drivers, etc., and the data used or generated by the functional components. Further, the server(s) 1204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a user device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1230 can additionally include an operating system 1242 for controlling and managing various functions of the server(s) 1204.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1202 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In at least one example, the system 1200 can include a datastore 1244 that can be configured to store data that is accessible, manageable, and updatable. In some examples, the datastore 1244 can be integrated with the user device 1202 and/or the server(s) 1204. In other examples, as shown in FIG. 12, the datastore 1244 can be located remotely from the server(s) 1204 and can be accessible to the server(s) 1204. The datastore 1244 can comprise multiple databases and/or servers connected locally and/or remotely via the network(s) 1206.

In at least one example, the datastore 1244 can store user profiles, which can include merchant profiles, customer profiles, and so on. In some examples, the datastore(s) 1244 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1244 can store additional or alternative types of data as described herein.

EXAMPLE CLAUSES

1. A method comprising: receiving, from a payment service and at a first user device having a payment application installed thereon, first encrypted data indicating first characteristics of a first user account associated with a first user, the first encrypted data including a first embedding of the first characteristics and being decryptable utilizing a first public key associated with the payment service; determining, while the first user device is offline, that a transaction has been initiated between the first user account and a second user account associated with a second device; while the first user device is offline: sending, via a short range communication protocol, the first encrypted data to the second user device; and receiving, via the short range communication protocol, second encrypted data from the second user device, the second encrypted data including a second embedding of second characteristics of the second account and being decryptable utilizing the first public key associated with the payment service; determining, utilizing a trained machine learning model stored on the first user device, a risk metric associated with the transaction, wherein the second embedding and transaction data indicating details of the transaction are input to the trained machine learning model; displaying the risk metric on the first device along with functionality for receiving user input data accepting or rejecting continuance of the transaction; and in response to receiving the user input data to accept continuance of the transaction, digitally signing first data documenting the transaction, wherein the first data is digitally signed by the first user device and the second user device.

2. The method as clause 1 recites, wherein the first characteristics include: an amount of time the first user account has been associated with the payment service; a payment type utilized in association with the first user account; incidents where the first user account has been deficient for a payment associated with the payment service; a frequency of interaction with the payment service over a period of time; and a frequency of recurring deposits made to the first user account.

3. The method as clauses 1 and/or 2 recite, further comprising: determining, from the second characteristics, a how recently the second embedding was received at the second user device from the payment service; and wherein determining the risk metric is based at least in part on how recently the second embedding was received at the second user device.

4. The method as any of clauses 1, 2, and/or 3 recite, wherein: the first embedding and the second embedding represent data generated by the payment service utilizing a machine learning model configured to determine the first characteristics and the second characteristics from first transaction data associated with the first user account and second transaction data associated with the second user account; and the first encrypted data includes an indication that the first encrypted data and the second encrypted data has been encrypted by the payment service such that only the payment service has authority to produce the encryptions.

5. A device comprising: one or more processors; and non-transitory computer-readable media storing instructions that, when executed by the one or more processors, cause the system to perform operations comprising: receiving, from a server, a first embedding of first characteristics associated with a first user account; initiating a transaction with another device associated with a second user account; exchanging, with the other device, the first embedding and a second embedding of second characteristics of the second user account; analyzing the second embedding utilizing a machine learning model prior to effectuating the transaction; and based at least in part on the analyzing, effectuating the transaction on the device prior to sending a representation of the transaction to the server for recording the transaction.

6. The device as clause 5 recites, the operations further comprising: receiving user input data requesting to effectuate the transaction based on the analyzing the second embedding; determining that the other device has received an indication that the transaction should be effectuated based on an analysis of the first embedding performed on the other device; and wherein effectuating the transaction is based at least in part on receiving the user input and determining that the other device has received the indication.

7. The device as clauses 5 and/or 6 recite, the operations further comprising: receiving user input data requesting to effectuate the transaction based on the analyzing the second embedding; determining that the first embedding was not sent to the other device; and wherein effectuating the transaction is based at least in part on receiving the user input and determining that the first embedding was not sent to the other device.

8. The device as any of clauses 5, 6, and/or 7 recite, the operation further comprising: based at least in part on initiating the transaction, causing a first quick reference (QR) code to be displayed on the device; receiving data representing a second QR code displayed on the other device and captured by the device; wherein exchanging the first embedding is performed utilizing the first QR code; and wherein exchanging the second embedding is performed utilizing the second QR code.

9. The device as any of clauses 5, 6, 7, and/or 8 recite, the operations further comprising: determining that the device is disconnected from the server when the transaction is initiated; querying the other device for an indication that the other device is connected to the server; and wherein exchanging the first embedding and the second embedding is based at least in part on the device being disconnected from the server and receiving response data from the other device indicating that the other device is disconnected from the server.

10. The device as any of clauses 5, 6, 7, 8, and/or 9 recite, wherein the analyzing the second embedding includes: causing the second embedding to be input into the machine learning model; generating, utilizing the machine learning model, a risk metric indicating a likelihood that the transaction will be approved; and displaying the risk metric on the device in association with functionality for selecting whether to effectuate the transaction.

11. The device as any of clauses 5, 6, 7, 8, 9, and/or 10 recite, the operations further comprising: receiving first data documenting the transaction from the other device, the first data digitally signed by the other device; digitally signing the first data documenting the transaction on the device in response to receiving user input data requesting to effectuate the transaction following the analyzing; and sending an instance of the first data digitally signed by the device to the other device to the server in response to the device being online with the server.

12. The device as any of clauses 5, 6, 7, 8, 9, 10, and/or 11 recite, the operations further comprising: determining that a connection to the server has been reestablished after effectuating the transaction on the device; and based at least in part on the connection to the server being reestablished, sending, to the server, first data documenting the transaction as digitally signed by the device and the other device.

13. A computer-implemented method comprising: receiving, from a server and at a first device, a first embedding of first characteristics associated with a first user account; initiating a transaction with a second device associated with a second user account; exchanging, with the second device, the first embedding and a second embedding of second characteristics of the second user account; generating first data representing an analysis of the second embedding utilizing a machine learning model prior to effectuating the transaction; and based at least in part on the first data, effectuating the transaction on the device prior to sending a representation of the transaction to the server for recording the transaction.

14. The computer-implemented method as clause 13 recites, the operations further comprising: generating the machine learning model configured to determine risk metrics from embeddings; generating a training dataset representing the risk metrics determining utilizing the machine learning model; training the machine learning model utilizing the training dataset; and wherein the first data is generated utilizing the trained machine learning model.

15. The computer-implemented method as clauses 13 and/or 14 recite, wherein exchanging the first embedding and the second embedding is performed when at least one of: the first device is determined to have lost connectivity to the server; a frequency of network traffic associated with the server satisfies a threshold frequency of network traffic; a response to a request to communicate with the server is not received from the server within a threshold period of time; receiving an indication that the server is not operating; or receiving an indication that a security risk is present with respect to communications from the first device to the server.

16. The computer-implemented method as any of clauses 13, 14, and/or 15 recite, further comprising: determining that the second embedding is received as encrypted data encrypted by the server; receiving a public key from the server; and decrypting the encrypted data to identify the second embedding.

17. The computer-implemented method as any of clauses 13, 14, 15, and/or 16 recite, wherein the first characteristics include at least one of: an amount of time the first user account has been associated with the server; incidents where the first user account has been deficient for a payment associated with the server; and a frequency of interaction with the server over a period of time.

18. The computer-implemented method as any of clauses 13, 14, 15, 16, and/or 17 recite, further comprising: determining, from the second characteristics, how recently the second embedding was received at the second user device from the server; and wherein generating the first data is based at least in part on how recently the second embedding was received at the second user device.

19. The computer-implemented method as any of clauses 13, 14, 15, 16, 17, and/or 18 recite, wherein the first embedding and the second embedding represent data generated by the server utilizing a model configured to determine the first characteristics and the second characteristics from first transaction data associated with the first user account and second transaction data associated with the second user account.

20. The computer-implemented method as any of clauses 13, 14, 15, 16, 17, 18, and/or 19 recite, wherein the generating the first data includes: causing the second embedding to be input into the machine learning model; and generating, utilizing the machine learning model, a risk metric indicating a likelihood that the funds for the transaction will be received from the second user account.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 5-7 for convenience and ease of understanding. However, the methods illustrated are not limited to being performed using components described in FIGS. 1-4 and 8-12, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A device comprising:

one or more processors; and non-transitory computer-readable media coupled to the one or more processors storing instructions that, when executed by the one or more processors, cause the device to perform operations comprising:

receiving, from a server, a first encrypted embedding of first characteristics associated with a first user account;

initiating a transaction with an other device associated with a second user account;

exchanging, with the other device, the first encrypted embedding and a second encrypted embedding of second characteristics of the second user account, wherein the second encrypted embedding includes encoded data and a timestamp that indicates when a second embedding was generated;

decrypting the second encrypted embedding with a public key associated with the server to identify the second embedding;

providing, as input to a machine learning model that is stored on the device, the second embedding and a transaction embedding, wherein the transaction embedding is based on transaction characteristics of the transaction;

interpreting, with the machine learning model, the second embedding and the transaction embedding to determine the second characteristics of the second user account and the transaction characteristics, respectively, without ingesting data that includes the second characteristics and the transaction characteristics, wherein the machine learning model is trained to output risk metrics based on training data representing feedback from offline transactions and previously-generated risk metrics;

prior to effectuating the transaction, outputting by the machine learning model based on the second embedding and the transaction embedding, a risk metric that indicates a likelihood of the transaction to be successful, wherein the risk metric is based on a recency of the second embedding as indicated by the timestamp and wherein the risk metric is output while at least one of the device and the other device are offline with respect to the server;

receiving user input data accepting the risk metric and requesting to effectuate the transaction;

based at least in part on the user input data, effectuating the transaction on the device, while the device is offline with respect to the server; and responsive to the device regaining connectivity to the server, transmitting to the server digitally signed data that documents the transaction.

2. The device as claim 1 recites, the operations further comprising:

determining that the other device has received an indication that the transaction is to be effectuated based on an analysis of a first embedding performed on the other device;

wherein effectuating the transaction is based at least in part on receiving the user input data and determining that the other device has received the indication.

3. The device as claim 1 recites, the operations further comprising:

determining that the first encrypted embedding was not sent to the other device;

wherein effectuating the transaction is based at least in part on receiving the user input data and determining that the first encrypted embedding was not sent to the other device.

4. The device as claim 1 recites, the operations further comprising:

based at least in part on initiating the transaction, causing a first quick reference (QR) code to be displayed on the device; and receiving data representing a second QR code displayed on the other device and captured by the device;

wherein exchanging the first encrypted embedding is performed utilizing the first QR code; and wherein exchanging the second encrypted embedding is performed utilizing the second QR code.

5. The device as claim 1 recites, the operations further comprising:

determining that the device is disconnected from the server when the transaction is initiated; and querying the other device for an indication that the other device is connected to the server;

wherein exchanging the first encrypted embedding and the second encrypted embedding is based at least in part on the device being disconnected from the server and receiving response data from the other device indicating that the other device is disconnected from the server.

6. The device as claim 1 recites, the operations further comprising:

displaying a risk metric indicator based on the risk metric on the device in association with functionality for selecting whether to effectuate the transaction;

wherein receiving the user input data comprises receiving a selection to effectuate the transaction.

7. The device as claim 1 recites, the operations further comprising:

receiving first data documenting the transaction from the other device, the first data digitally signed by the other device; and digitally signing the first data documenting the transaction on the device in response to receiving user input data requesting to effectuate the transaction following generation of the risk metric;

wherein transmitting to the server the digitally signed data that documents the transaction includes transmitting to the server the first data digitally signed by the device and digitally signed by the other device.

8. The device as claim 1 recites, wherein the second embedding is based on one or more characteristics selected from a group of an amount of time the second user account has been associated with the server, a payment type utilized in association with the second user account, an incident of the second user account being deficient for a payment associated with the server, a frequency of interaction of the other device with the server over a period of time, a frequency of a recurring deposit made to the second user account, and combinations thereof; and wherein the transaction embedding is based on an amount of funds associated with the transaction.

9. The device as claim 1 recites, wherein the machine learning model is further trained by using statistical analysis techniques to validate an accuracy of the risk metrics of the machine learning model.

10. The device as claim 1 recites, wherein interpreting the second embedding by the machine learning model without ingesting the data that includes the second characteristics utilizes lower computing resources than providing the data that includes the second characteristics for processing by the machine learning model.

11. A computer-implemented method comprising:

receiving, from a server and at a first device, a first encrypted embedding of first characteristics associated with a first user account;

initiating a transaction with a second device associated with a second user account;

exchanging, with the second device, the first encrypted embedding and a second encrypted embedding of second characteristics of the second user account, wherein the second encrypted embedding includes encoded data and a timestamp that indicates when a second embedding was generated;

decrypting the second encrypted embedding with a public key associated with the server to identify the second embedding;

providing, as input to a machine learning model that is stored on the first device, the second embedding and a transaction embedding, wherein the transaction embedding is based on transaction characteristics of the transaction;

interpreting, with the machine learning model, the second embedding and the transaction embedding to determine the second characteristics of the second user account and the transaction characteristics, respectively, wherein the second embedding and the transaction embedding are distinct from the second characteristics and the transaction characteristics, wherein the machine learning model is trained to output risk metrics based on training data representing feedback from offline transactions and previously generated risk metrics;

prior to effectuating the transaction, outputting by the machine learning model based on the second embedding and the transaction embedding, a risk metric that indicates a likelihood of the transaction to be successful, wherein the risk metric is based on a recency of the second embedding as indicated by the timestamp and wherein the risk metric is output while at least one of the first device and the second device are offline with respect to the server;

receiving user input data accepting the risk metric and requesting to effectuate the transaction;

based at least in part on the user input data, effectuating the transaction on the first device, while the first device or the second device is offline with respect to the server; and responsive to the first device regaining connectivity to the server, transmitting to the server digitally signed data that documents the transaction.

12. The computer-implemented method as claim 11 recites, further comprising:

training the machine learning model to determine risk metrics from embeddings by:

generating a training dataset that includes characteristics of offline transactions, generated risk metrics, and feedback data that indicates results of the offline transactions after display of the risk metrics; and training the machine learning model utilizing the training dataset.

13. The computer-implemented method as claim 11 recites, wherein exchanging the first encrypted embedding and the second encrypted embedding is performed when at least one of:

the first device is determined to have lost connectivity to the server;

a frequency of network traffic associated with the server satisfies a threshold frequency of network traffic;

a response to a request to communicate with the server is not received from the server within a threshold period of time;

an indication that the server is not operating is received; or an indication that a security risk is present with respect to communications from the first device to the server is received.

14. The computer-implemented method as claim 11 recites, further comprising:

determining that the transaction embedding is an encrypted transaction embedding received by the server; and decrypting the encrypted transaction embedding, wherein interpreting the second embedding and the transaction embedding is performed after decrypting the encrypted transaction embedding.

15. The computer-implemented method as claim 11 recites, wherein the first characteristics include at least one of:

an amount of time the first user account has been associated with the server;

incidents where the first user account has been deficient for a payment associated with the server; and a frequency of interaction with the server over a period of time.

16. The computer-implemented method as claim 11 recites, wherein interpreting the second embedding by the machine learning model without ingesting data that includes the second characteristics utilizes lower computing resources than providing the data that includes the second characteristics for processing by the machine learning model.

17. The computer-implemented method as claim 11 recites, wherein the second embedding is a numerical representation of the second characteristics of the second user account.

18. The computer-implemented method as claim 11 recites, wherein the transaction characteristics of the transaction embedding include one or more characteristics selected from a group of an amount of funds associated with the transaction, a type of item sold in the transaction, a time of the transaction, a type of software being used, a type of hardware being used, and combinations thereof.

19. A non-transitory computer-readable medium with instructions stored thereon that, when executed by one or more computers, cause the one or more computers to perform operations, the operations comprising:

receiving, at a first device and from a server, a first encrypted embedding of first characteristics associated with a first user account;

initiating a transaction with an other device associated with a second user account;

exchanging, with the other device, the first encrypted embedding and a second encrypted embedding of second characteristics of the second user account, wherein the second encrypted embedding includes encoded data and a timestamp that indicates when a second embedding was generated;

decrypting the second encrypted embedding with a public key associated with the server to identify the second embedding;

providing, as input to a machine learning model that is stored on the first device, the second embedding and a transaction embedding, wherein the transaction embedding is based on transaction characteristics of the transaction;

interpreting, with the machine learning model, the second embedding and the transaction embedding to determine the second characteristics of the second user account and the transaction characteristics, respectively, without ingesting data that includes the second characteristics and the transaction characteristics, wherein the machine learning model is trained to output risk metrics based on training data representing feedback from offline transactions and previously-generated risk metrics;

prior to effectuating the transaction, outputting by the machine learning model based on the second embedding and the transaction embedding, a risk metric that indicates a likelihood of the transaction to be successful, wherein the risk metric is based on a recency of the second embedding as indicated by the timestamp and wherein the risk metric is output while at least one of the first device and the other device are offline with respect to the server;

receiving user input data accepting the risk metric and requesting to effectuate the transaction;

based at least in part on the user input data, effectuating the transaction on the first device, while the first device is offline with respect to the server; and responsive to the first device regaining connectivity to the server, transmitting to the server digitally signed data that documents the transaction.

20. The computer-readable medium as claim 19 recites, the operations further comprising:

determining that the other device has received an indication that the transaction is to be effectuated based on an analysis of a first embedding performed on the other device;

wherein effectuating the transaction is based at least in part on receiving the user input data and determining that the other device has received the indication.

* * * * *